United States Patent
Khoshnevisan et al.

(10) Patent No.: US 12,452,840 B2
(45) Date of Patent: *Oct. 21, 2025

(54) DEFAULT BEAM FOR MULTI-DOWNLINK CONTROL INFORMATION BASED MULTI-TRANSMIT RECEIVE POINT WITH UNIFIED TRANSMISSION CONFIGURATION INDICATOR

(71) Applicant: QUALCOMM Incorporated, San Diego, CA (US)

(72) Inventors: Mostafa Khoshnevisan, San Diego, CA (US); Yan Zhou, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,421

(22) Filed: Jun. 20, 2024

(65) Prior Publication Data
US 2024/0422742 A1 Dec. 19, 2024

Related U.S. Application Data

(63) Continuation of application No. 17/650,059, filed on Feb. 4, 2022, now Pat. No. 12,052,691.

(51) Int. Cl.
| | |
|---|---|
| *H04W 72/02* | (2009.01) |
| *H04W 72/044* | (2023.01) |
| *H04W 72/0446* | (2023.01) |
| *H04W 72/1273* | (2023.01) |
| *H04W 72/23* | (2023.01) |

(52) U.S. Cl.
CPC ....... *H04W 72/02* (2013.01); *H04W 72/0446* (2013.01); *H04W 72/046* (2013.01); *H04W 72/1273* (2013.01); *H04W 72/23* (2023.01)

(58) Field of Classification Search
CPC ........... H04W 72/1273; H04W 72/046; H04W 72/0446; H04W 72/23; H04W 72/02
USPC ........................................................ 370/329
See application file for complete search history.

(56) References Cited

U.S. PATENT DOCUMENTS

| | | | |
|---|---|---|---|
| 12,052,691 B2* | 7/2024 | Khoshnevisan | ...... H04L 5/0035 |
| 2021/0136802 A1 | 5/2021 | Cirik et al. | |
| 2021/0410132 A1 | 12/2021 | Xu et al. | |

(Continued)

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a user equipment (UE) may receive, in a first control resource set (CORESET) associated with a first CORESET pool index, first downlink control information (DCI) that indicates a first transmission configuration indicator (TCI) state to be applied starting from a first starting time. The UE may receive, in a second CORESET associated with a second CORESET pool index, second DCI that indicates a second TCI state to be applied starting from a second starting time. The UE may receive third DCI that schedules a downlink communication. The UE may receive the downlink communication using a default beam associated with the first CORESET pool index or the second CORESET pool index in connection with a default beam condition associated with the third DCI. Numerous other aspects are described.

20 Claims, 19 Drawing Sheets

(56) References Cited

U.S. PATENT DOCUMENTS

| | | |
|---|---|---|
| 2022/0039072 A1 | 2/2022 | Babaei |
| 2022/0256572 A1 | 8/2022 | Kim et al. |
| 2022/0417909 A1 | 12/2022 | Zhu et al. |
| 2023/0156850 A1 | 5/2023 | Cirik et al. |
| 2023/0199795 A1 | 6/2023 | Zhu et al. |
| 2023/0208597 A1 | 6/2023 | Yao et al. |
| 2023/0232481 A1 | 7/2023 | Park et al. |
| 2023/0254815 A1 | 8/2023 | Khoshnevisan et al. |
| 2023/0254854 A1 | 8/2023 | Cirik et al. |
| 2023/0284283 A1 | 9/2023 | Xu et al. |
| 2023/0300830 A1 | 9/2023 | Yokomakura et al. |
| 2023/0328830 A1 | 10/2023 | Yi et al. |
| 2023/0379835 A1 | 11/2023 | Matsumura et al. |

\* cited by examiner

DEFAULT BEAM FOR MULTI-DOWNLINK CONTROL INFORMATION BASED MULTI-TRANSMIT RECEIVE POINT WITH UNIFIED TRANSMISSION CONFIGURATION INDICATOR

RELATED APPLICATION

This application is a continuation of U.S. patent application Ser. No. 17/650,059, entitled "DEFAULT BEAM FOR MULTI-DOWNLINK CONTROL INFORMATION BASED MULTI-TRANSMIT RECEIVE POINT WITH UNIFIED TRANSMISSION CONFIGURATION INDICATOR," filed Feb. 4, 2022, which is incorporated herein by reference in its entirety.

FIELD OF THE DISCLOSURE

Aspects of the present disclosure generally relate to wireless communication and to techniques and apparatuses for a default beam for multi-downlink control information (DCI) based multi-transmit receive point (TRP) with a unified transmission configuration indicator (TCI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, in a first control resource set (CORESET) associated with a first CORESET pool index, first downlink control information (DCI) that indicates a first transmission configuration indicator (TCI) state to be applied starting from a first starting time associated with the first DCI. The one or more processors may be configured to receive, in a second CORESET associated with a second CORESET pool index, second DCI that indicates a second TCI state to be applied starting from a second starting time associated with the second DCI. The one or more processors may be configured to receive third DCI that schedules a downlink communication. The one or more processors may be configured to receive the downlink communication using a default beam associated with the first CORESET pool index or the second CORESET pool index in connection with a default beam condition associated with the third DCI.

Some aspects described herein relate to a UE for wireless communication. The UE may include a memory and one or more processors coupled to the memory. The one or more processors may be configured to receive, in a first component carrier, first DCI that indicates a first TCI state to be applied for communications associated with a first CORESET pool index in a second component carrier starting from a first starting time associated with the first DCI. The one or more processors may be configured to receive second DCI that indicates a second TCI state to be applied for communications associated with a second CORESET pool index in the second component carrier starting from a second starting time associated with the second DCI. The one or more processors may be configured to receive, in the first component carrier, third DCI that schedules a downlink communication in the second component carrier. The one or more processors may be configured to receive the downlink communication in the second component carrier using a default beam in connection with a default beam condition associated with the third DCI, wherein the default beam is determined to be a beam associated with the first TCI state or a beam associated with the second TCI state based at least in part on whether the downlink communication is associated with the first CORESET pool index or the second CORESET pool index.

Some aspects described herein relate to a network node for wireless communication. The network node may include a memory and one or more processors coupled to the memory. The one or more processors may be configured to transmit, in a first CORESET associated with a first CORESET pool index of multiple CORESET pool indexes configured for a UE, first DCI that indicates a TCI state to be applied starting from a starting time associated with the first DCI. The one or more processors may be configured to transmit a downlink communication scheduled by second DCI using a default beam in connection with a default beam condition associated with the second DCI and in connection with the default beam being associated with the first CORESET pool index.

Some aspects described herein relate to a method of wireless communication performed by a UE. The method may include receiving, in a first CORESET associated with a first CORESET pool index, first DCI that indicates a first TCI state to be applied starting from a first starting time associated with the first DCI. The method may include receiving, in a second CORESET associated with a second CORESET pool index, second DCI that indicates a second TCI state to be applied starting from a second starting time associated with the second DCI. The method may include receiving third DCI that schedules a downlink communication. The method may include receiving the downlink communication using a default beam associated with the first CORESET pool index or the second CORESET pool index in connection with a default beam condition associated with the third DCI.

Some aspects described herein relate to a method of wireless communication performed by a UE. The method may include receiving, in a first component carrier, first DCI that indicates a first TCI state to be applied for communications associated with a first CORESET pool index in a second component carrier starting from a first starting time associated with the first DCI. The method may include receiving second DCI that indicates a second TCI state to be applied for communications associated with a second CORESET pool index in the second component carrier starting from a second starting time associated with the second DCI. The method may include receiving, in the first component carrier, third DCI that schedules a downlink communication in the second component carrier. The method may include receiving the downlink communication in the second component carrier using a default beam in connection with a default beam condition associated with the third DCI, wherein the default beam is determined to be a beam associated with the first TCI state or a beam associated with the second TCI state based at least in part on whether the downlink communication is associated with the first CORESET pool index or the second CORESET pool index.

Some aspects described herein relate to a method of wireless communication performed by a network node. The method may include transmitting, in a first CORESET associated with a first CORESET pool index of multiple CORESET pool indexes configured for a UE, first DCI that indicates a TCI state to be applied starting from a starting time associated with the first DCI. The method may include transmitting a downlink communication scheduled by second DCI using a default beam in connection with a default beam condition associated with the second DCI and in connection with the default beam being associated with the first CORESET pool index.

Some aspects described herein relate to a non-transitory computer-readable medium that stores a set of instructions for wireless communication by a UE. The set of instructions, when executed by one or more processors of the UE, may cause the UE to receive, in a first CORESET associated with a first CORESET pool index, first DCI that indicates a first TCI state to be applied starting from a first starting time associated with the first DCI. The set of instructions, when executed by one or more processors of the UE, may cause the UE to receive, in a second CORESET associated with a second CORESET pool index, second DCI that indicates a second TCI state to be applied starting from a second starting time associated with the second DCI. The set of instructions, when executed by one or more processors of the UE, may cause the UE to receive third DCI that schedules a downlink communication. The set of instructions, when executed by one or more processors of the UE, may cause the UE to receive the downlink communication using a default beam associated with the first CORESET pool index or the second CORESET pool index in connection with a default beam condition associated with the third DCI.

Some aspects described herein relate to a non-transitory computer-readable medium that stores a set of instructions for wireless communication by a UE. The set of instructions, when executed by one or more processors of the UE, may cause the UE to receive, in a first component carrier, first DCI that indicates a first TCI state to be applied for communications associated with a first CORESET pool index in a second component carrier starting from a first starting time associated with the first DCI. The set of instructions, when executed by one or more processors of the UE, may cause the UE to receive second DCI that indicates a second TCI state to be applied for communications associated with a second CORESET pool index in the second component carrier starting from a second starting time associated with the second DCI. The set of instructions, when executed by one or more processors of the UE, may cause the UE to receive, in the first component carrier, third DCI that schedules a downlink communication in the second component carrier. The set of instructions, when executed by one or more processors of the UE, may cause the UE to receive the downlink communication in the second component carrier using a default beam in connection with a default beam condition associated with the third DCI, wherein the default beam is determined to be a beam associated with the first TCI state or a beam associated with the second TCI state based at least in part on whether the downlink communication is associated with the first CORESET pool index or the second CORESET pool index.

Some aspects described herein relate to a non-transitory computer-readable medium that stores a set of instructions for wireless communication by a network node. The set of instructions, when executed by one or more processors of the network node, may cause the network node to transmit, in a first CORESET associated with a first CORESET pool index of multiple CORESET pool indexes configured for a UE, first DCI that indicates a TCI state to be applied starting from a starting time associated with the first DCI. The set of instructions, when executed by one or more processors of the network node, may cause the network node to transmit a downlink communication scheduled by second DCI using a default beam in connection with a default beam condition associated with the second DCI and in connection with the default beam being associated with the first CORESET pool index.

Some aspects described herein relate to an apparatus for wireless communication. The apparatus may include means for receiving, in a first CORESET associated with a first CORESET pool index, first DCI that indicates a first TCI state to be applied starting from a first starting time associated with the first DCI. The apparatus may include means for receiving, in a second CORESET associated with a second CORESET pool index, second DCI that indicates a second TCI state to be applied starting from a second starting time associated with the second DCI. The apparatus may include means for receiving third DCI that schedules a downlink communication. The apparatus may include means for receiving the downlink communication using a default beam associated with the first CORESET pool index or the second CORESET pool index in connection with a default beam condition associated with the third DCI.

Some aspects described herein relate to an apparatus for wireless communication. The apparatus may include means for receiving, in a first component carrier, first DCI that indicates a first TCI state to be applied for communications associated with a first CORESET pool index in a second component carrier starting from a first starting time associated with the first DCI. The apparatus may include means for receiving second DCI that indicates a second TCI state to be applied for communications associated with a second CORESET pool index in the second component carrier starting from a second starting time associated with the second DCI. The apparatus may include means for receiving, in the first component carrier, third DCI that schedules a downlink communication in the second component carrier. The apparatus may include means for receiving the downlink communication in the second component carrier using a default beam in connection with a default beam condition associated with the third DCI, wherein the default beam is determined to be a beam associated with the first TCI state or a beam associated with the second TCI state based at least in part on whether the downlink communication is associated with the first CORESET pool index or the second CORESET pool index.

Some aspects described herein relate to an apparatus for wireless communication. The apparatus may include means for transmitting, in a first CORESET associated with a first CORESET pool index of multiple CORESET pool indexes configured for a UE, first DCI that indicates a TCI state to be applied starting from a starting time associated with the first DCI. The apparatus may include means for transmitting a downlink communication scheduled by second DCI using a default beam in connection with a default beam condition associated with the second DCI and in connection with the default beam being associated with the first CORESET pool index.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
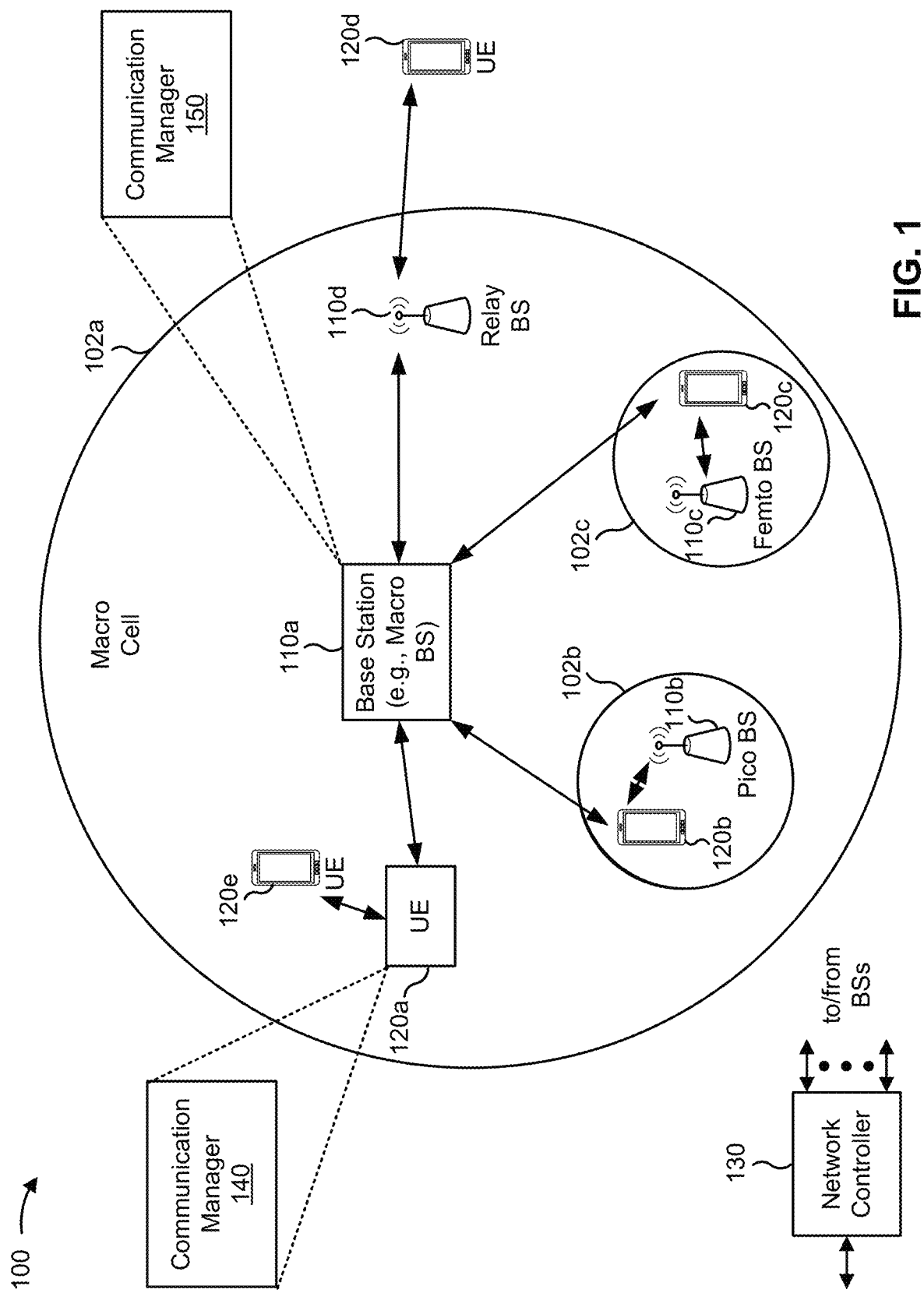
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, in a first control resource set (CORESET) associated with a first CORESET pool index, first downlink control information (DCI) that indicates a first transmission configuration indicator (TCI) state to be applied starting from a first starting time associated with the first DCI; receive, in a second CORESET associated with a second CORESET pool index, second DCI that indicates a second TCI state to be applied starting from a second starting time associated with the second DCI; receive third DCI that schedules a downlink communication; and receive the downlink communication using a default beam associated with the first CORESET pool index or the second CORESET pool index in connection with a default beam condition associated with the third DCI. Additionally, or alternatively, the communication manager 140 may perform one or more other operations described herein.

In some aspects, as described in more detail elsewhere herein, the communication manager 140 may receive, in a first component carrier, first DCI that indicates a first TCI state to be applied for communications associated with a first CORESET pool index in a second component carrier starting from a first starting time associated with the first DCI;

receive second DCI that indicates a second TCI state to be applied for communications associated with a second CORESET pool index in the second component carrier starting from a second starting time associated with the second DCI; receive, in the first component carrier, third DCI that schedules a downlink communication in the second component carrier; and receive the downlink communication in the second component carrier using a default beam in connection with a default beam condition associated with the third DCI, wherein the default beam is determined to be a beam associated with the first TCI state or a beam associated with the second TCI state based at least in part on whether the downlink communication is associated with the first CORESET pool index or the second CORESET pool index. Additionally, or alternatively, the communication manager 140 may perform one or more other operations described herein.

In some aspects, a network node (e.g., a base station 110, a TRP, or one or more components described in connection with FIG. 3) may include a communication manager 150. As described in more detail elsewhere herein, the communication manager 150 may transmit, in a first CORESET associated with a first CORESET pool index of multiple CORESET pool indexes configured for a UE, first DCI that indicates a TCI state to be applied starting from a starting time associated with the first DCI; and transmit a downlink communication scheduled by second DCI using a default beam in connection with a default beam condition associated with the second DCI and in connection with the default beam being associated with the first CORESET pool index. Additionally, or alternatively, the communication manager 150 may perform one or more other operations described herein.

As indicated above, FIG. 1 is provided as an example. Other examples may differ from what is described with regard to FIG. 1.

Figure 2:
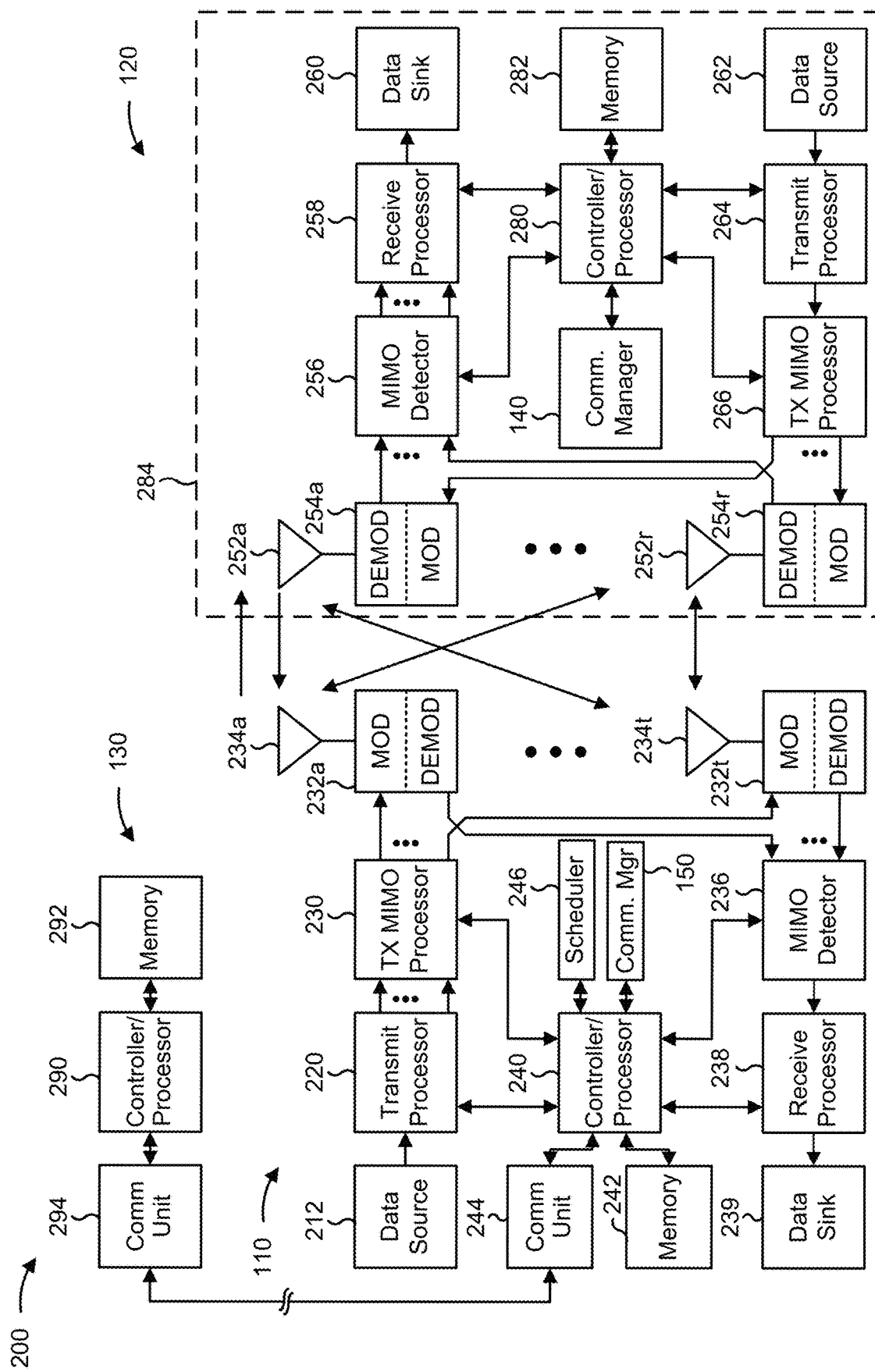
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 11-19).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 11-19).

The controller/processor 240 of the base station 110, the controller/processor 280 of the UE 120, and/or any other component(s) of FIG. 2 may perform one or more techniques associated with a default beam for multi-DCI based multi-TRP with a unified TCI, as described in more detail elsewhere herein. For example, the controller/processor 240 of the base station 110, the controller/processor 280 of the UE 120, and/or any other component(s) of FIG. 2 may perform or direct operations of, for example, process 1500 of FIG. 15, process 1600 of FIG. 16, process 1700 of FIG. 17, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1500 of FIG. 15, process 1600 of FIG. 16, process 1700 of FIG. 17, and/or other processes as described herein. In some examples, executing instructions may include running the instructions, converting the instructions, compiling the instructions, and/or interpreting the instructions, among other examples. In some aspects, a network node described herein is the base station 110, is included in the base station 110, or includes one or more components of the base station 110 shown in FIG. 2. In some aspects, a TRP described herein is the base station 110, is included in the base station 110, or includes one or more components of the base station 110 shown in FIG. 2.

In some aspects, the UE 120 includes means for receiving, in a first CORESET associated with a first CORESET pool index, first DCI that indicates a first TCI state to be applied starting from a first starting time associated with the first DCI; means for receiving, in a second CORESET associated with a second CORESET pool index, second DCI that indicates a second TCI state to be applied starting from a second starting time associated with the second DCI; means for receiving third DCI that schedules a downlink communication; and/or means for receiving the downlink communication using a default beam associated with the first CORESET pool index or the second CORESET pool index in connection with a default beam condition associated with the third DCI.

In some aspects, the UE 120 includes means for receiving, in a first component carrier, first DCI that indicates a first TCI state to be applied for communications associated with a first CORESET pool index in a second component carrier starting from a first starting time associated with the first DCI; means for receiving second DCI that indicates a second TCI state to be applied for communications associated with a second CORESET pool index in the second component carrier starting from a second starting time associated with the second DCI; means for receiving, in the first component carrier, third DCI that schedules a downlink communication in the second component carrier; and/or means for receiving the downlink communication in the second component carrier using a default beam in connection with a default beam condition associated with the third DCI, wherein the default beam is determined to be a beam associated with the first TCI state or a beam associated with the second TCI state based at least in part on whether the downlink communication is associated with the first CORESET pool index or the second CORESET pool index. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node includes means for transmitting, in a first CORESET associated with a first CORESET pool index of multiple CORESET pool indexes configured for a UE, first DCI that indicates a TCI state to be applied starting from a starting time associated with the first DCI; and/or means for transmitting a downlink communication scheduled by second DCI using a default beam in connection with a default beam condition associated with the second DCI and in connection with the default beam being associated with the first CORESET pool index. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
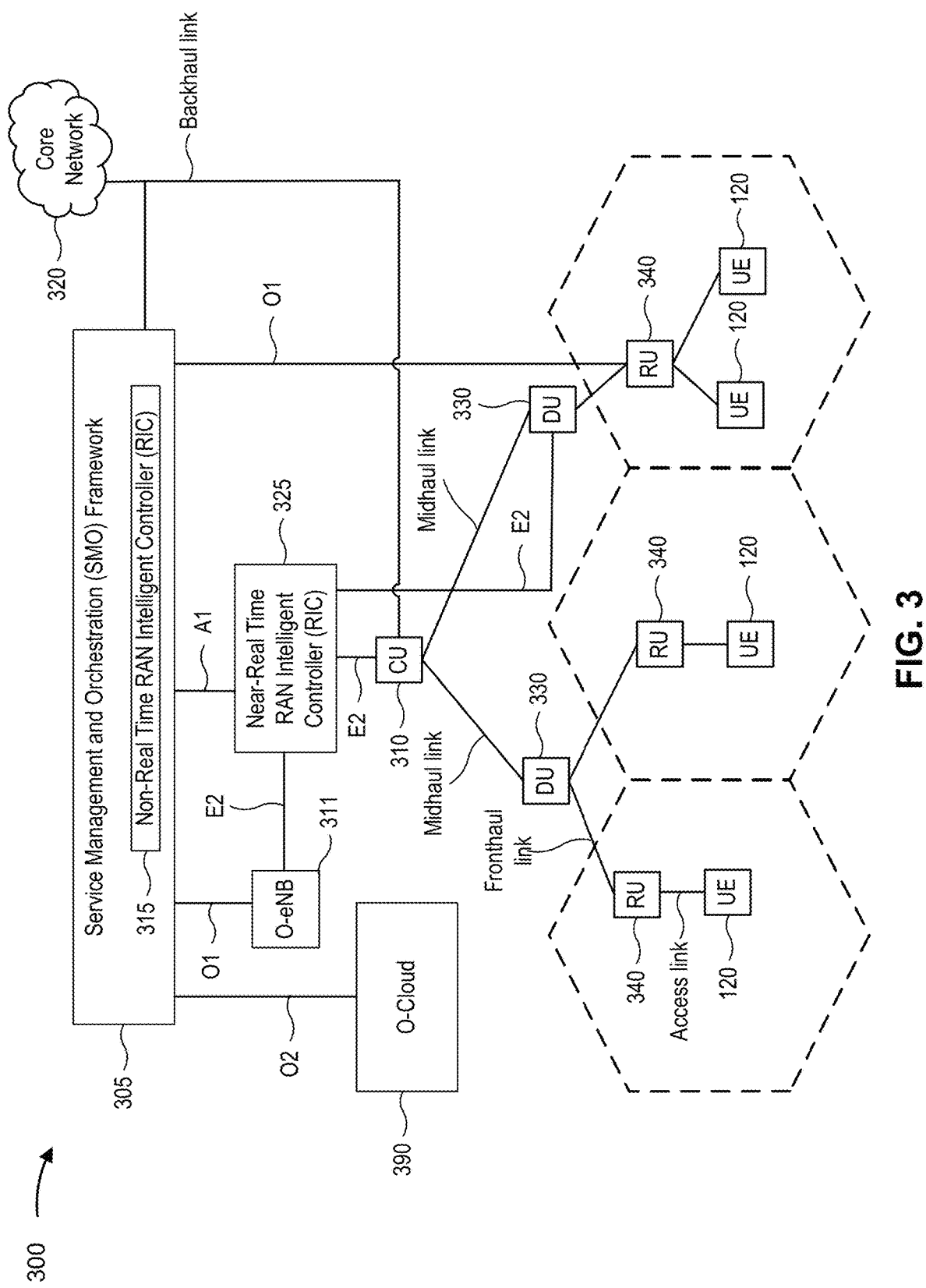
FIG. 3 is a diagram illustrating an example disaggregated base station architecture, in accordance with the present disclosure.

FIG. 3 is a diagram illustrating an example disaggregated base station 300 architecture. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with respect to FIG. 3.

Figure 4:
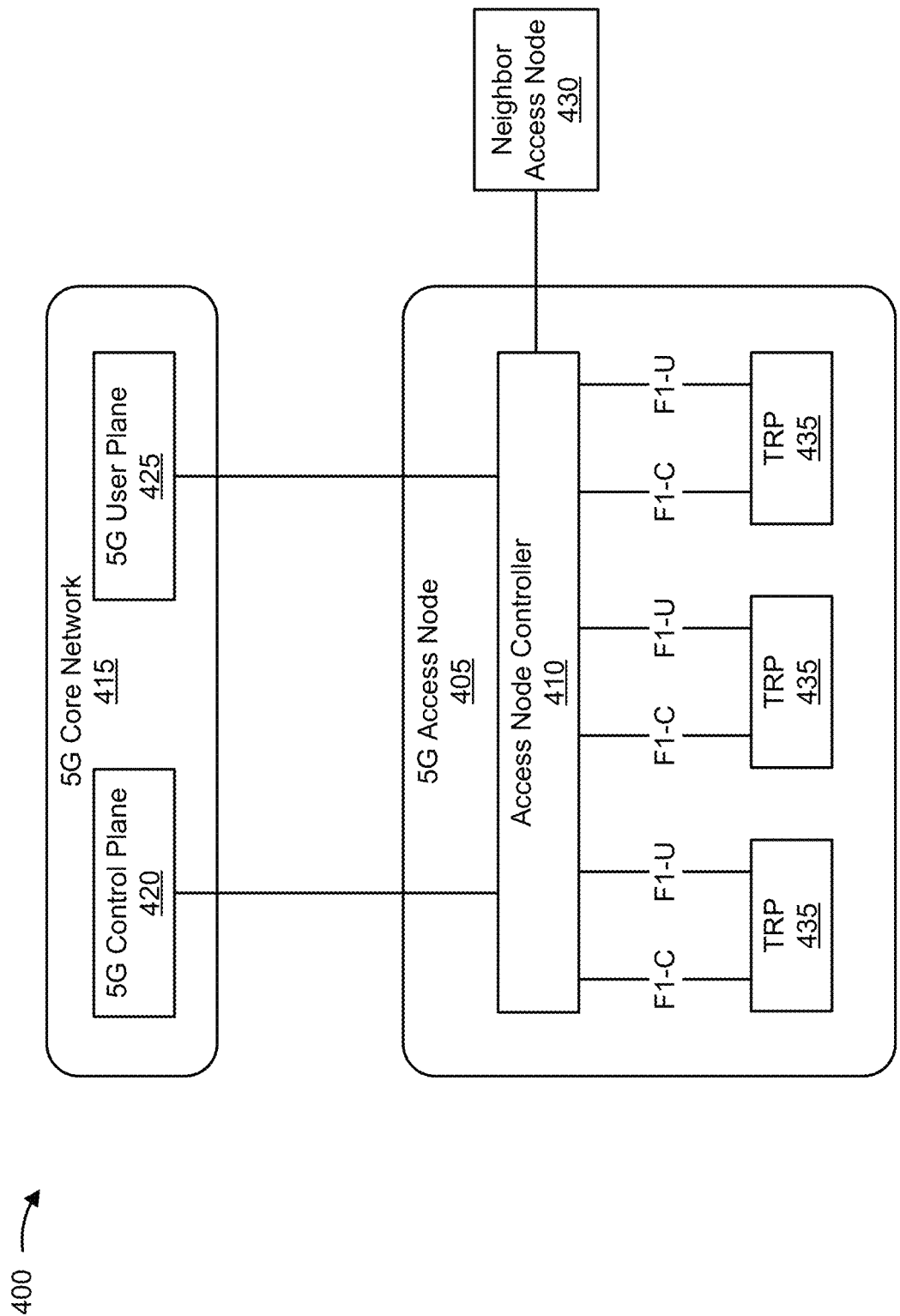
FIG. 4 is a diagram illustrating an example logical architecture of a distributed radio access network (RAN), in accordance with the present disclosure.

FIG. 4 is a diagram illustrating an example logical architecture of a distributed RAN 400, in accordance with the present disclosure.

A 5G access node 405 may include an access node controller 410. The access node controller 410 may be a CU of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may be a DU of the distributed RAN 400. In some aspects, a TRP 435 may correspond to a base station 110 described above in connection with FIG. 1. For example, different TRPs 435 may be included in different base stations 110. Additionally, or alternatively, multiple TRPs 435 may be included in a single base station 110. In some aspects, a base station 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400. For example, a PDCP layer, an RLC layer, and/or a MAC layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different TCI states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
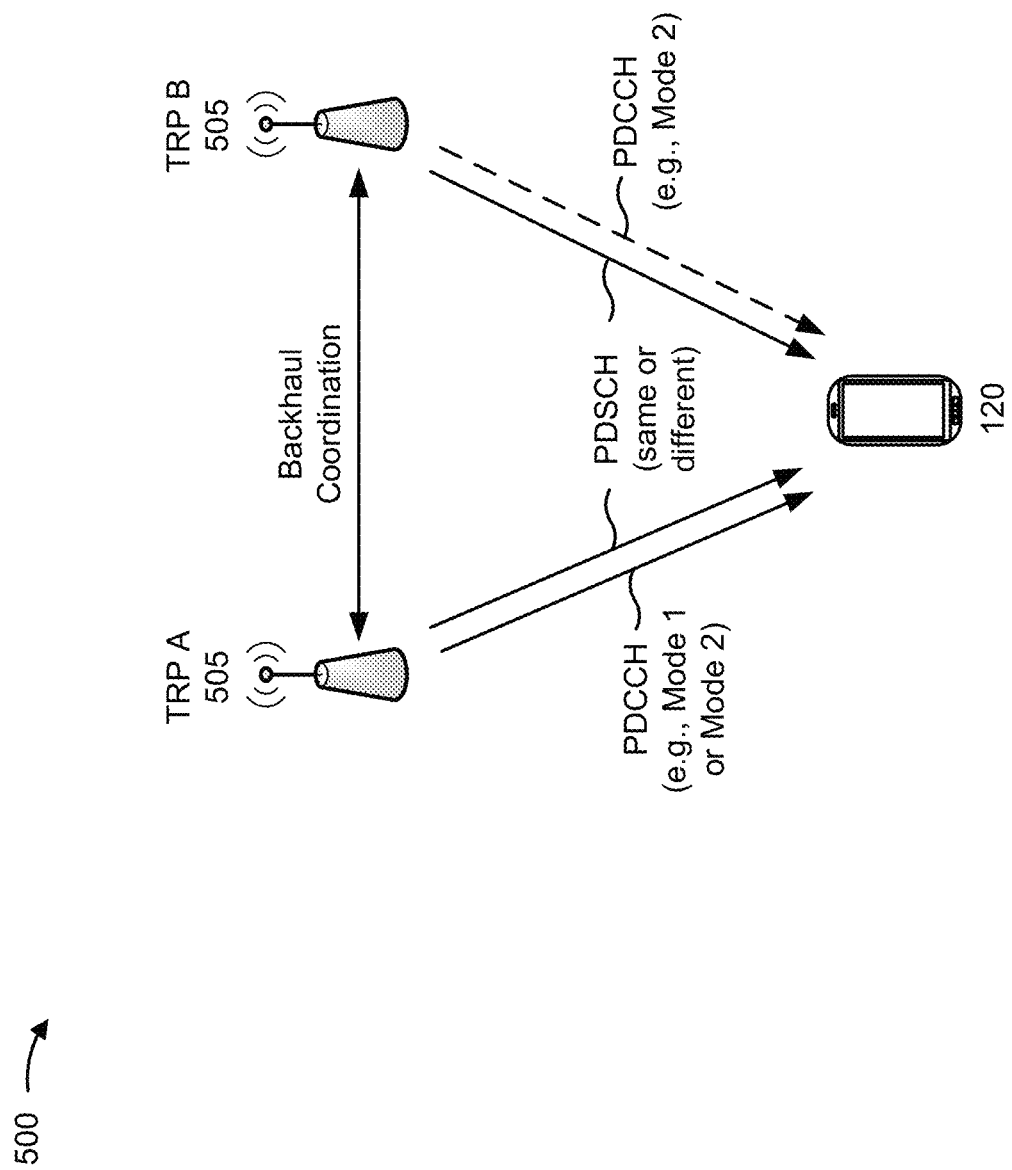
FIG. 5 is a diagram illustrating an example of multi-transmit receive point (TRP) communication, in accordance with the present disclosure.

FIG. 5 is a diagram illustrating an example 500 of multi-TRP communication (sometimes referred to as multi-panel communication), in accordance with the present disclosure. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same base station 110 (e.g., when the TRPs 505 are different antenna arrays or panels of the same base station 110), and may have a larger delay and/or lower capacity (as compared to co-location) when the TRPs 505 are located at different base stations 110. The different TRPs 505 may communicate with the UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of the DCI indicates the corresponding TCI state (e.g., the TCI field of the first DCI indicates the first TCI state and the TCI field of the second DCI indicates the second TCI state). The second multi-TRP transmission mode (e.g., Mode 2) may also be referred to as "multi-DCI based multi-TRP."

As indicated above, FIG. 5 is provided as an example. Other examples may differ from what is described with respect to FIG. 5.

Figure 6:
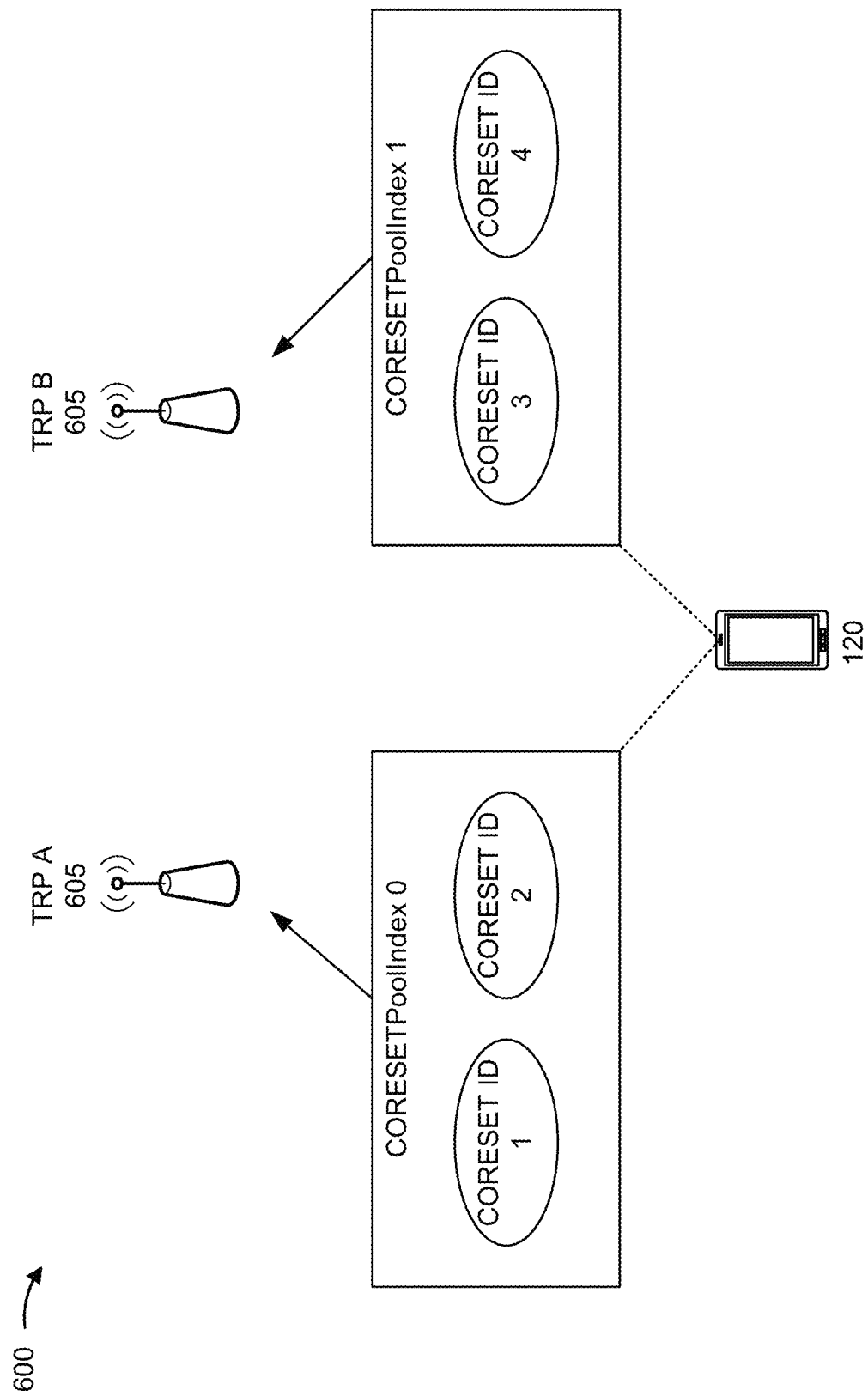
FIG. 6 is a diagram illustrating an example of TRP differentiation at a UE based at least in part on a control resource set (CORESET) pool index, in accordance with the present disclosure.

FIG. 6 is a diagram illustrating an example 600 of TRP differentiation at a UE based at least in part on a CORESET pool index, in accordance with the present disclosure. In some aspects, a CORESET pool index (or CORESET-PoolIndex) value may be used by a UE (e.g., UE 120) to identify a TRP associated with an uplink grant received on a PDCCH.

A CORESET may refer to a control region that is structured to support an efficient use of resources, such as by flexible configuration or reconfiguration of resources for one or more PDCCHs associated with a UE. In some aspects, a CORESET may occupy the first symbol of an orthogonal frequency division multiplexing (OFDM) slot, the first two symbols of an OFDM slot, or the first three symbols of an OFDM slot. Thus, a CORESET may include multiple resource blocks (RBs) in the frequency domain, and either one, two, or three symbols in the time domain. In 5G, a quantity of resources included in a CORESET may be flexibly configured, such as by using RRC signaling to indicate a frequency domain region (for example, a quantity of RBs) or a time domain region (for example, a quantity of symbols) for the CORESET.

As illustrated in FIG. 6, a UE 120 may be configured with multiple CORESETs in a given serving cell. Each CORESET configured for the UE 120 may be associated with a CORESET identifier (CORESET ID). For example, a first CORESET configured for the UE 120 may be associated with CORESET ID 1, a second CORESET configured for the UE 120 may be associated with CORESET ID 2, a third CORESET configured for the UE 120 may be associated with CORESET ID 3, and a fourth CORESET configured for the UE 120 may be associated with CORESET ID 4.

As further illustrated in FIG. 6, two or more (for example, up to five) CORESETs may be grouped into a CORESET pool. Each CORESET pool may be associated with a CORESET pool index. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a particular TRP 605. As an example, and as illustrated in FIG. 6, a first TRP 605 (TRP A) may be associated with CORESET pool index 0 and a second TRP 605 (TRP B) may be associated with CORESET pool index 1. The UE 120 may be configured by a higher layer parameter, such as PDCCH-Config, with information identifying an association between a TRP and a CORESET pool index value assigned to the TRP. Accordingly, the UE 120 may identify the TRP that transmitted DCI to the UE 120 by determining the CORESET ID of the CORESET in which the PDCCH carrying the DCI was transmitted, determining the CORESET pool index value associated with the CORESET pool in which the CORESET ID is included, and identifying the TRP associated with the CORESET pool index value. Multi-TRP operation may be defined for the UE 120 in a given component carrier (CC) by configuring two CORESET pool index values in different CORESETs in an active bandwidth part (BWP) of the CC. In some examples, if a CORESET is not configured with a CORESET pool index value, a CORESET pool index value of 0 may be assumed for that CORESET.

As indicated above, FIG. 6 is provided as an example. Other examples may differ from what is described with respect to FIG. 6.

Figure 7:
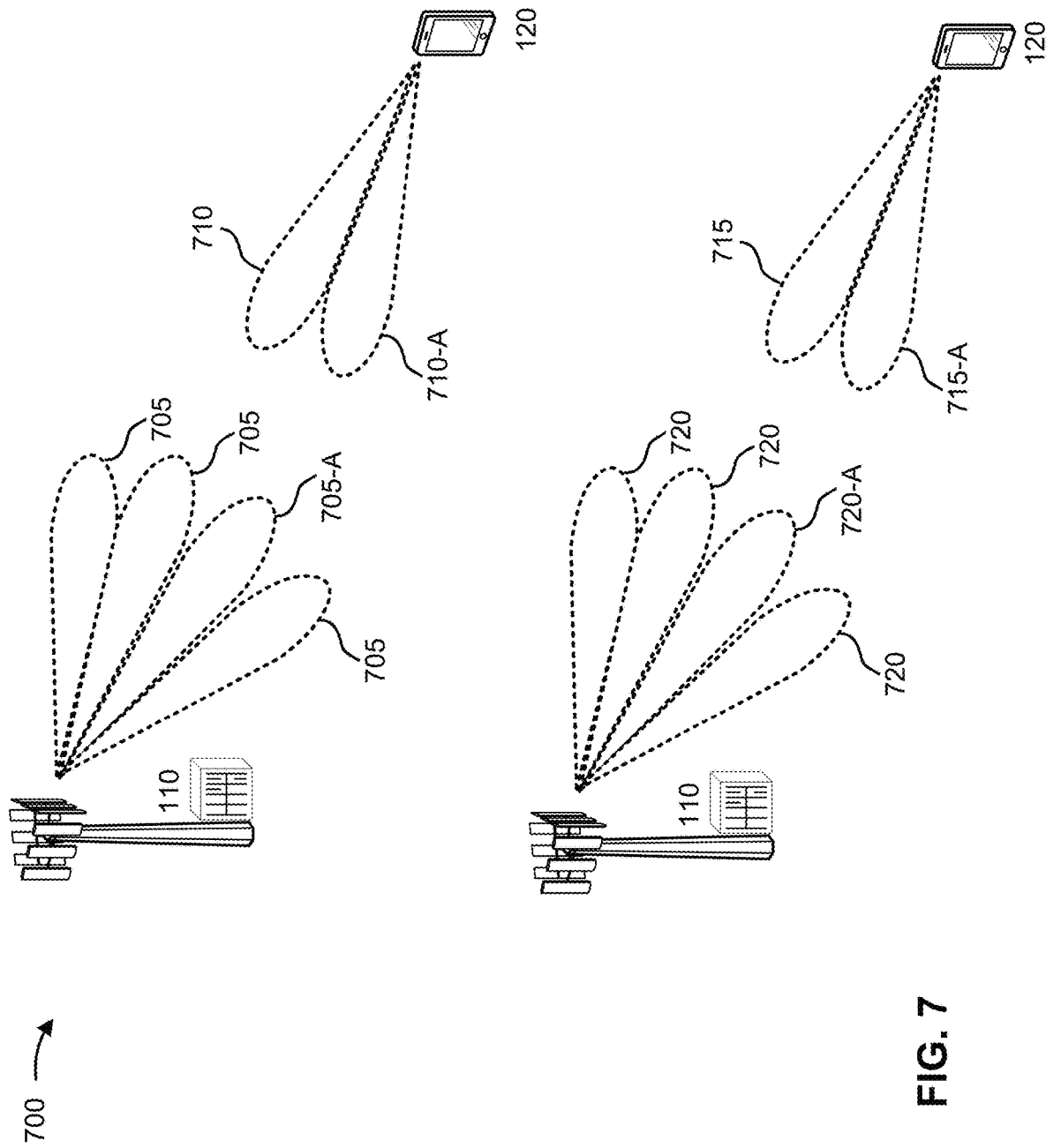
FIG. 7 is a diagram illustrating an example of using beams for communications between a base station and a UE, in accordance with the present disclosure.

FIG. 7 is a diagram illustrating an example 700 of using beams for communications between a base station and a UE, in accordance with the present disclosure. As shown in FIG. 7, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit (Tx) beam, and the UE 120 may receive the transmission using a directional UE receive (Rx) beam. Each BS Tx beam may have an associated beam identifier (ID), beam direction, or beam symbols, among other examples. The base station 110 may transmit downlink communications via one or more BS Tx beams 705.

The UE 120 may attempt to receive downlink transmissions via one or more UE Rx beams 710, which may be configured using different beamforming parameters at Rx circuitry of the UE 120. The UE 120 may identify a particular BS Tx beam 705, shown as BS Tx beam 705-A, and a particular UE Rx beam 710, shown as UE Rx beam 710-A, that provide relatively favorable performance (for example, that have a best channel quality of the different measured combinations of BS Tx beams 705 and UE Rx beams 710). In some examples, the UE 120 may transmit an indication of which BS Tx beam 705 is identified by the UE 120 as a preferred BS Tx beam, which the base station 110 may select for transmissions to the UE 120. The UE 120 may thus attain and maintain a beam pair link (BPL) with the base station 110 for downlink communications (for example, a combination of the BS Tx beam 705-A and the UE Rx beam 710-A), which may be further refined and maintained in accordance with one or more established beam refinement procedures.

A downlink beam, such as a BS Tx beam 705 or a UE Rx beam 710, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS Tx beam 705 may be associated with a synchronization signal block (SSB), and the UE 120 may indicate a preferred BS Tx beam 705 by transmitting uplink transmissions in resources of the SSB that are associated with the preferred BS Tx beam 705. A particular SSB may have an associated TCI state (for example, for an antenna port or for beamforming). The base station 110 may, in some examples, indicate a downlink BS Tx beam 705 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE Rx beam 710 at the UE 120. Thus, the UE 120 may select a corresponding UE Rx beam 710 from a set of BPLs based at least in part on the base station 110 indicating a BS Tx beam 705 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a CORESET. The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, a number (e.g., up to 128) TCI states may be configured for the UE 120 by a configuration message, such as an RRC message, that is transmitted from the base station 110 to the UE 120. In some examples, the base station 110 may transmit, to the UE 120, a MAC control element (MAC-CE) that activates a number (e.g., up to 8) of the configured TCI states for PDSCH. For example, the MAC-CE may indicate a set of activated TCI states for PDSCH for the UE 120. The activated TCI states may be mapped to respective TCI codepoints in DCI. In some examples, DCI that schedules a PDSCH communication (e.g., DCI format 1_1 and/or DCI format 1_2) may indicate an activated TCI state, from the set of activated TCI states, via a TCI field included in the DCI. For example, the TCI field of the DCI may include an indication of a TCI codepoint that maps to an activated TCI state to be used by the UE 120 to receive the scheduled PDSCH communication. In some examples, the indication of the activated TCI in the DCI that schedules a PDSCH communication may not be applicable to PDSCH communications other than the PDSCH communication scheduled by that DCI. In some cases, the TCI field may not be present in scheduling DCI for a PDSCH communication (e.g., based at least in part on RRC configurations tci-PresentinDCI and/or tci-PresentinDCI-1-2, which are included as part of a CORESET configuration). In some examples, if the TCI field is not present in scheduling DCI for a PDSCH communication, the TCI state for the scheduled PDSCH communication follows the TCI state of the scheduling CORESET (e.g., the CORESET in which the scheduling DCI is detected by the UE 120).

In some examples, when two CORESET pool index values are configured for a CC (e.g., for multi-TRP operation), separate MAC-CEs may be transmitted to the UE 120 to activate a number (e.g., up to 8) TCI states per CORESET pool index. For example, a first MAC-CE may indicate a first set of activated TCI states associated with a first CORESET pool index value (e.g., CORESET pool index 0) and a second MAC-CE may indicate a second set of activate TCI states associated with a second CORESET pool index value (e.g., CORESET pool index 1). The first set of activated TCI states associated with the first CORESET pool index value are activated states for communications between the UE 120 and a first TRP, and the second set of activated TCI states associated with the second CORESET pool index value are activated states for communications between the UE 120 and a second TRP. In this case, a TCI codepoint in the TCI field of a DCI (e.g., DCI format 1_1 or 1_2) may be interpreted differently (e.g., based on the corresponding MAC-CE) depending on whether the DCI is received in a CORESET associated with the first CORESET pool index value (e.g., CORESET pool index 0) or in a CORESET associated with the second CORESET pool index value (e.g., CORESET pool index 1).

For uplink communications, the UE 120 may transmit in the direction of the base station 110 using a directional UE Tx beam, and the base station 110 may receive the transmission using a directional BS Rx beam. Each UE Tx beam may have an associated beam ID, beam direction, or beam symbols, among other examples. The UE 120 may transmit uplink communications via one or more UE transmit beams 715.

The base station 110 may receive uplink transmissions via one or more BS Rx beams 720. The base station 110 may identify a particular UE Tx beam 715, shown as UE Tx beam 715-A, and a particular BS Rx beam 720, shown as BS Rx beam 720-A, that provide relatively favorable performance (for example, that have a best channel quality of the different measured combinations of UE Tx beams 715 and BS Rx beams 720). In some examples, the base station 110 may transmit an indication of which UE Tx beam 715 is identified by the base station 110 as a preferred UE Tx beam, which the base station 110 may select for transmissions from the UE 120. The UE 120 and the base station 110 may thus attain and maintain a BPL for uplink communications (for example, a combination of the UE Tx beam 715-A and the BS Rx beam 720-A), which may be further refined and maintained in accordance with one or more established beam refinement procedures. In some examples, an uplink beam, such as a UE Tx beam 715 or a BS Rx beam 720, may be associated with a spatial relation. A spatial relation may indicate a directionality or a characteristic of the uplink beam, similar to one or more QCL properties, as described above.

As indicated above, FIG. 7 is provided as an example. Other examples may differ from what is described with respect to FIG. 7.

Figure 8:
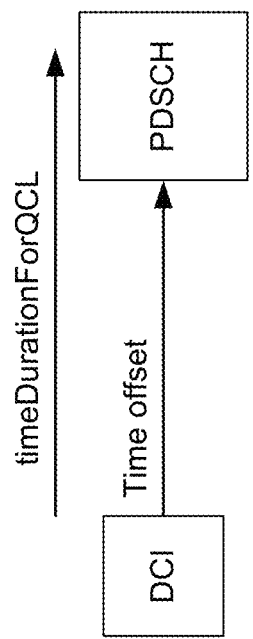
FIG. 8 is a diagram illustrating an example of using a default beam for a downlink communication, in accordance with the present disclosure.

FIG. 8 is a diagram illustrating an example 800 of using a default beam for a downlink communication, in accordance with the present disclosure.

As shown in FIG. 8, a UE (e.g., UE 120) may receive DCI that schedules a PDSCH communication. The PDSCH communication may be scheduled to be transmitted to the UE at a scheduling offset with respect to the DCI that schedules the PDSCH communication. "Scheduling offset" refers to a time offset between the DCI and the PDSCH communication scheduled by the DCI. The DCI may include an indication of a TCI state that identifies the downlink beam (e.g., the UE Rx beam) for the PDSCH communication. The TCI state may indicate a QCL property of a downlink beam in accordance with a QCL type. In some cases (e.g., for communications in FR2), the QCL type may be QCL-TypeD, which indicates spatial receive parameters for the downlink beam. In some examples, in a case in which QCL-TypeD is used (e.g., in FR2), the indicated TCI state in the scheduling DCI for a PDSCH communication may only be applied for the PDSCH communication if the scheduling offset between the scheduling DCI and the scheduled PDSCH communication is equal to or larger than a time duration for QCL (e.g., timeDurationForQCL). The time duration for QCL (e.g., timeDurationForQCL) may be a time duration indicated in or configured based at least in part on UE capability information for the UE. For example, the time duration for QCL (e.g., time DurationForQCL) may be a time duration in which the UE is capable of decoding DCI and changing an Rx beam of the UE in accordance with an indicated TCI state in the DCI.

As shown in FIG. 8, in some cases, the scheduling offset for a scheduled PDSCH communication may be less than the time duration for QCL (e.g., timeDurationForQCL). If the scheduling offset is less than the time duration for QCL (e.g., timeDurationForQCL), a default beam may be used for the PDSCH communication, as there may not be enough time for the UE to decode the DCI and apply an Rx beam corresponding to the TCI state indicated in the DCI. The default beam may be a beam associated with a default QCL assumption (e.g., for QCL-TypeD) for PDSCH.

The UE may be configured with periodic monitoring occasions for search space (SS) sets associated with different CORESETs. In some examples, in a case in which the scheduling offset between a scheduling DCI and a scheduled PDSCH communication is less than the time duration for QCL (e.g., timeDurationForQCL), the default QCL assumption that identifies the default beam for the PDSCH communication may be a QCL/TCI state associated with a CORESET having a lowest CORESET ID among CORESETs with monitored SS sets in a latest slot in which one or more CORESETs within an active BWP of a serving cell are monitored by the UE. That is, the default beam for a PDSCH communication with a scheduling offset that is less than the time duration for QCL may be the beam associated with a monitored CORESET having the lowest CORESET ID in the latest slot (with respect to the slot in which the PDSCH communication is scheduled) in which one or more CORESETs are monitored by the UE. In some examples, the UE may use the TCI state of the monitored CORESET ID in the latest slot in which one or more CORESETs are monitored to determine the default QCL assumption for a PDSCH communication with a scheduling offset that is less than the time duration for QCL in cases in which the UE is not configured with two CORESET pool index values and/or in cases in which the UE is configured with two CORESET pool index values, but the UE is not configured with two default beams enabled for the two CORESET pool index values (e.g., respective default beams enabled for the two CORESET pool index values).

When two CORESET pool index values are configured for a CC, the UE may indicate the capability of the UE to use to default beams (e.g., a respective default beam per CORESET pool index value). In some cases, the UE may be configured (e.g., via RRC signaling) to enable respective default beams for the two CORESET pool index values. For example, an RRC parameter enableDefaultTCI-StateperCoresetPoolIndex may indicate whether the UE is configured with two default beams enabled for the two CORESET pool index values. In the case in which two CORESET pool index values are configured for a UE (e.g., multi-TRP operation), and the UE is configured with two default beams enabled for the two CORESET pool index values, the default QCL assumption for a PDSCH communication associated with a CORESET index pool value (e.g., based at least in part on the CORESET pool index value of the PDCCH communication including the DCI that scheduled the PDSCH communication) may be a QCL/TCI state associated with a CORESET having a lowest CORESET ID among CORESETs associated with the same CORESET index pool value as the PDSCH communication with monitored SS sets in a latest slot in which one or more CORESETs associated with that CORESET index poll value within the active BWP of the serving cell are monitored by the UE. That is, the default beam for a PDSCH communication associated with a CORESET index pool value may be the beam associated with the CORESET having the lowest CORESET ID among monitored CORESETs associated with the index pool value in a latest slot in which one or more CORESETs associated with the index pool value are monitored.

As indicated above, FIG. 8 is provided as an example. Other examples may differ from what is described with respect to FIG. 8.

Figure 9:
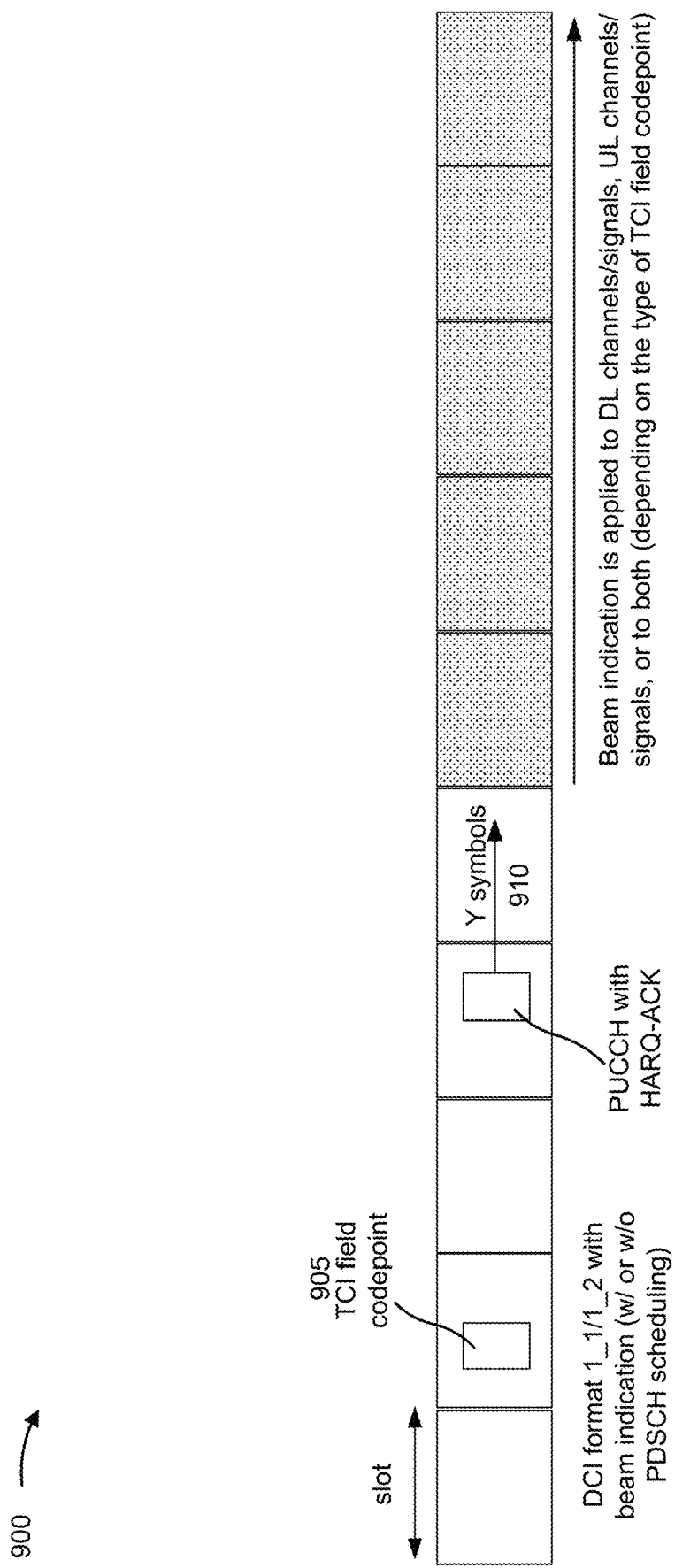
FIG. 9 is a diagram illustrating an example of using a unified transmission configuration indicator (TCI) beam indication, in accordance with the present disclosure.

FIG. 9 is a diagram illustrating an example 900 of using a unified TCI beam indication, in accordance with the present disclosure.

As described above in connection with FIG. 7, in some examples, a TCI state may be used for a downlink beam indication, and a spatial relation may be used for an uplink beam indication. Such beam indications may be referred to herein as "non-unified beam indications." Non-unified beam indications may be applied to one channel for one communication scheduled in that channel.

In some examples, a base station (e.g., base station 110) and a UE (e.g., UE 120) may use a unified TCI framework for both downlink and uplink beam indications. In the unified TCI framework, TCI state indications may be used to indicate a joint downlink and uplink TCI state or to indicate separate downlink and uplink TCI states. Such a TCI state indication that may be used to indicate a joint downlink and uplink beam, a separate downlink beam, or a separate uplink beam is referred to herein as a "unified TCI state indication." A unified TCI state indication (e.g., a joint downlink and uplink TCI state indication and/or separate downlink and uplink TCI state indications) may be applied to multiple channels. For example, the unified TCI state indication of a joint uplink and downlink TCI state may be used to indicate a beam direction for one or more downlink channels (e.g., PDSCH and/or PDCCH) or reference signals (e.g., CSI-RS) and for one or more uplink channels (e.g., physical uplink shared channel (PUSCH) and/or physical uplink control channel (PUCCH)) or reference signals (e.g., a sounding reference signal (SRS)). The unified TCI state indication of a separate downlink TCI state may be used to indicate a beam direction for multiple downlink channels (e.g., PDSCH and PDCCH) or reference signals (e.g., CSI-RS). The unified TCI state indication of a separate uplink TCI state may be used to indicate a beam direction to be used for multiple uplink channels (e.g., PUSCH and PUCCH) or reference signals (e.g., SRS). In some examples, the unified TCI state indication may be "sticky," such that the indicated beam direction will be used for the channels and/or reference signals to which the TCI state indication applies until a further indication is received.

In some examples, there may be two TCI state indication modes in the unified TCI state framework. A first mode may be a separate downlink and uplink TCI state indication mode, in which separate downlink and uplink TCI states are used to indicate downlink and uplink beam directions for the UE. For example, the separate downlink and uplink TCI state indication mode may be used when the UE is having maximum permissible exposure (MPE) issues to indicate different beam directions, for the UE, for an uplink beam (e.g., a UE Tx beam) and a downlink beam (e.g., a UE Rx beam). A second mode may be a joint downlink and uplink TCI state indication mode, in which a TCI state indication is used to indicate, to the UE, a joint uplink and downlink beam direction. For example, the joint downlink and uplink TCI state indication mode may be used when the UE has channel correspondence between downlink and uplink channels (which may be assumed in some examples), and the same beam direction can be used for an uplink beam (e.g., a UE Tx beam) and a downlink beam (e.g., a UE Rx beam).

In some examples, in the unified TCI state framework, downlink TCI states, uplink TCI states, and/or joint downlink and uplink TCI states may be configured for a UE via RRC signaling from a base station. A MAC-CE, transmitted from the base station to the UE, may activate a number of the RRC-configured TCI states and indicate a mapping of TCI field codepoints. In some examples, one TCI field codepoint may represent a joint downlink and uplink TCI state, and the TCI field codepoint may be used for a joint downlink and uplink beam indication. In some examples, one TCI field may represent a pair of TCI states including a downlink TCI state and an uplink TCI state, and the TCI field codepoint may be used for a separate downlink and uplink beam indication. In some examples, one TCI field codepoint may represent only a downlink TCI state, and the TCI field codepoint may be used for a downlink only beam indication. In some examples, one TCI field codepoint may represent only an uplink TCI state, and the TCI field codepoint may be used for an uplink only beam indication. If the MAC-CE indicates a mapping to only a single TCI field codepoint, the MAC-CE may serve as the beam indication. In this case, the UE may begin applying the beam indication indicated in the MAC-CE a certain time duration (e.g., 3 ms) after a hybrid automatic repeat request acknowledgement (HARQ-ACK) transmitted to the base station in response to the PDSCH communication carrying the MAC-CE.

If the MAC-CE indicates a mapping to more than one TCI field codepoint, DCI including an indication of a TCI field codepoint may be used to provide a beam indication to the UE. As shown in FIG. 9, and by reference number 905, the UE may receive (e.g., via a PDCCH communication) DCI that includes an indication of a TCI field codepoint. The TCI field codepoint may map to a unified TCI state indication, which may correspond to a joint downlink and uplink TCI state, a separate downlink and uplink TCI state pair, a downlink only TCI state, or an uplink only TCI state. In some aspects, DL DCI (e.g., DCI format 1_1/1_2), with or without a downlink assignment, may be used to provide the beam indication (e.g., the indication of the TCI field codepoint). The DCI that includes the indication of the TCI field codepoint may be referred to a "beam indication DCI."

As further shown in FIG. 9, the UE may transmit, to the base station, a PUCCH communication that includes a HARQ-ACK in response to the DCI including the TCI field codepoint (e.g., the beam indication DCI). As shown by reference number 910, the UE may apply the beam indication starting in a first slot that is at least Y symbols after a last symbol of the PUCCH communication carrying the HARQ-ACK feedback transmitted in response to the beam indication DCI. For example, Y may be configured for the UE (e.g., via RRC signaling) based at least in part on UE capability. The beam indication may be applied to downlink channels and reference signals (e.g., PDSCH, PDCCH, and CSI-RS), uplink channels and reference signals (e.g., PUSCH, PUCCH, and SRS), or both downlink and uplink channels and reference signals, depending on the type of TCI field codepoint. The beam indication (e.g., the unified TCI state indication) may be "sticky." That is, the beam indication is not specific to a scheduled PDSCH communication, but instead once the UE starts applying the beam indication, the UE may continue to use indicated beam for the applicable channels and reference signals until the UE receives another beam indication DCI (e.g., another DCI format 1_1/1_2 including a TCI field codepoint) that changes the beam.

As indicated above, FIG. 9 is provided as an example. Other examples may differ from what is described with respect to FIG. 9.

Figure 10:
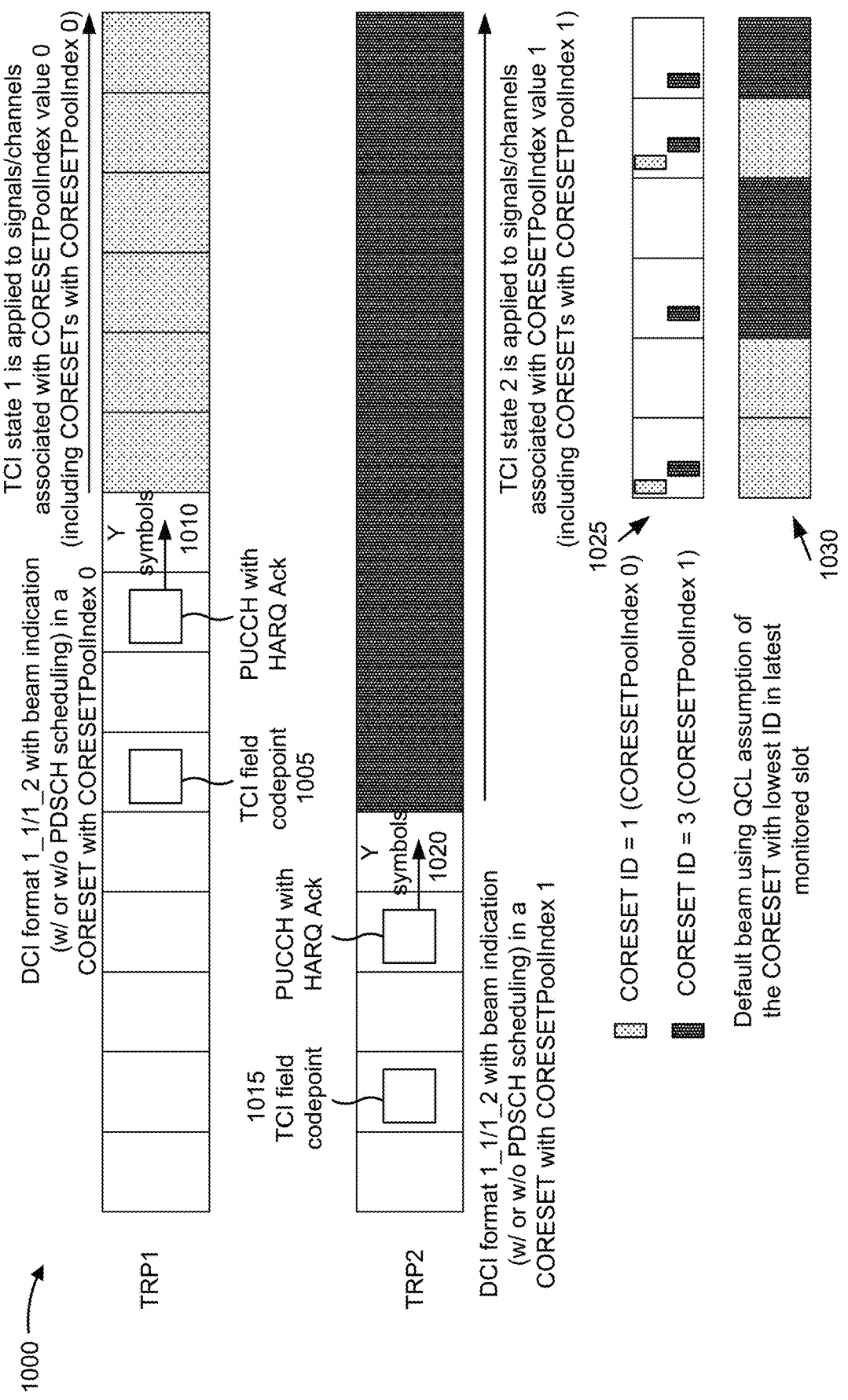
FIG. 10 is a diagram illustrating an example of using unified TCI beam indications for multi-downlink control information (DCI) based multi-TRP communications, in accordance with the present disclosure.

FIG. 10 is a diagram illustrating an example 1000 of using unified TCI beam indications for multi-DCI based multi-TRP communications, in accordance with the present disclosure.

In some aspects, the unified TCI framework may be extended to multi-TRP communications including multi-DCI based multi-TRP. In the case of multi-DCI based multi-TRP, separate unified TCI beam indications for multiple downlink and/or uplink channels and signals may be transmitted to a UE (e.g., UE 120) for channels and signals associated with different CORESET pool index values. As shown in FIG. 10, UE may communicate with a first TRP (TRP1) and a second TRP (TRP2) in a multi-DCI multi-TRP mode. TRP1 may be associated with a first CORESET pool index (CORESET pool index 0), and TRP2 may be associated with a second CORESET pool index (CORESET pool index 1).

As shown by reference number 1005, the UE may receive, from TRP1, first beam indication DCI that includes a TCI field codepoint that indicates a first unified TCI state (e.g., TCI state 1) to be applied to multiple downlink and/or uplink channels and signals associated with CORESET pool index 0 (e.g., for communications between TRP1 and the UE). The UE may receive a PDCCH communication carrying the first beam indication DCI in a CORESET associated with CORESET pool index 0. The first beam indication DCI may be DCI format 1_1 or 1_2, with or without a downlink assignment (e.g., with or without PDSCH scheduling). The TCI field codepoint may map to a unified TCI state (e.g., TCI state 1), from a set of activated TCI states associated with CORESET pool index 0 for the UE. For example, the TCI field codepoint included in the first beam indication may map to a joint downlink and uplink TCI state, a separate downlink and uplink TCI state pair, a downlink only TCI state, or an uplink only TCI state. The UE may transmit, to TRP1, a PUCCH communication that includes HARQ-ACK feedback for the first beam indication DCI. As shown by reference number 1010, the UE may apply TCI state 1 (e.g., the TCI state indicated in the first beam indication DCI) starting in a first slot that is at least Y symbols after a last symbol of the PUCCH communication carrying the HARQ-ACK feedback transmitted in response to the first beam indication DCI. For example, Y may be configured for the UE (e.g., via RRC signaling) based at least in part on UE capability. TCI state 1 may be applied to downlink and/or uplink channels and reference signals associated with CORESET pool index 0 (e.g., including CORESETs associated with CORESET pool index 0). The indication of the unified TCI state (e.g., TCI state 1) in the first beam indication may be "sticky," such that the indicated TCI state will be used for the channels and/or reference signals to which the TCI state indication applies until another beam indication DCI associated with CORESET pool index 0 is received by the UE.

As shown by reference number 1015, the UE may receive, from TRP2, second beam indication DCI that includes a TCI field codepoint that indicates a second unified TCI state (e.g., TCI state 2) to be applied to multiple downlink and/or uplink channels and signals associated with CORESET pool index 1 (e.g., for communications between TRP2 and the UE). The UE may receive a PDCCH communication carrying the second beam indication DCI in a CORESET associated with CORESET pool index 1. The second beam indication DCI may be DCI format 1_1 or 1_2, with or without a downlink assignment (e.g., with or without PDSCH scheduling). The TCI field codepoint may map to a unified TCI state (e.g., TCI state 2), from a set of activated TCI states associated with CORESET pool index 1 for the UE. For example, the TCI field codepoint included in the second beam indication may map to a joint downlink and uplink TCI state, a separate downlink and uplink TCI state pair, a downlink only TCI state, or an uplink only TCI state. The UE may transmit, to TRP2, a PUCCH communication that includes HARQ-ACK feedback for the second beam indication DCI. As shown by reference number 1020, the UE may apply TCI state 2 (e.g., the TCI state indicated in the second beam indication DCI) starting in a first slot that is at least Y symbols after a last symbol of the PUCCH communication carrying the HARQ-ACK feedback transmitted in response to the second beam indication DCI. TCI state 2 may be applied to downlink and/or uplink channels and reference signals associated with CORESET pool index 1 (e.g., including CORESETs associated with CORESET pool index 1). The indication of the unified TCI state (e.g., TCI state 2) in the second beam indication may be "sticky," such that the indicated TCI state will be used for the channels and/or reference signals to which the TCI state indication applies until another beam indication DCI associated with CORESET pool index 1 is received by the UE.

The UE may receive, from TRP1 or TRP2, scheduling DCI (e.g., DCI format 1_1 or 1_2) that schedules a PDSCH communication to the UE. For example, the UE may receive scheduling DCI from TRP1 in a CORESET associated with CORESET pool index 0, or the UE may receive scheduling DCI from TRP2 in a CORESET associated with CORESET pool index 1. In cases in which QCL-TypeD (e.g., FR2) is used, when the scheduling offset between the scheduling DCI and the scheduled PDSCH communication is less than a time duration for QCL (e.g., timeDurationForQCL), the UE may use a default beam for receiving the scheduled PDSCH communication. When the UE is configured with two default beams (e.g., respective default beams for the two CORESET pool index values) enabled (e.g., by enableDefaultTCI-StatePerCoresetPoolIndex), the default beam for receiving the scheduled PDSCH communication may be a beam associated with a monitored CORESET associated with the same CORESET pool index as the scheduled PDSCH (e.g., a beam associated with the same CORESET pool index as the PDCCH communication carrying the scheduling DCI that scheduled the PDSCH communication), as described above in connection with FIG. 8. However, the UE may not be configured with two default beams (e.g., a respective default beam per CORESET pool index) enabled for multi-DCI based multi-TRP. For example, the UE may not be configured with two default beams enabled in a case in which the UE is not capable of receiving two different beams simultaneously and/or in a case in which the UE does not indicate the capability to use two default beams to a base station (e.g., via TRP1 or TRP2). In some cases, the UE may be capable of using two default beams, but a base station may not configure the UE with two default beams enabled, for example to reduce power consumption associated with the UE buffering on two default beams.

In some examples, in a case in which the UE is not configured with two default beams (e.g., respective default beams for the two CORESET pool indexes) enabled for multi-DCI based multi-TRP, the default beam for a scheduled PDSCH communication with a scheduling offset that is less than the time duration for QCL (e.g., timeDurationForQCL) may be a beam associated with a monitored CORESET having the lowest CORESET ID in the latest slot (with respect to the slot in which the PDSCH communication is scheduled) in which one or more CORESETs are monitored by the UE. As shown in FIG. 10, and by reference number 1025, the UE may be configured with monitoring occasions for search space sets associated with a first CORESET with a CORESET ID of 1 and monitoring occasions of SS sets associated with a second CORESET with a CORESET ID of 3. The first CORESET (e.g., CORESET ID=1) may be associated with CORESET pool index 0, and the second CORESET (e.g., CORESET ID=3) may be associated with CORESET pool index 1. The default beam for a PDSCH communication scheduled in a given slot may be determined using the QCL assumption of the CORESET with the lowest CORESET ID in the latest monitored slot (e.g., the latest slot in which one or more CORESETs are monitored by the UE). As shown by reference number 1030, if the PDSCH communication is scheduled in a slot in which the first CORESET (e.g., CORESET ID=1) and the second CORESET are both monitored by the UE, the default beam used for the PDSCH communication is a beam associated with the first CORESET, which has a lower CORESET ID than the second CORESET. If the PDSCH communication is scheduled in a slot in which only the second CORESET is monitored by the UE, the default beam for the PDSCH communication is the beam associated with the second CORESET. If the PDSCH communication is scheduled in a slot in which no CORESET is monitored by the UE, the default beam for the PDSCH communication is the beam associated with the monitored CORESET with the lowest CORESET ID in a latest slot, prior to the slot in which the PDSCH communication is scheduled, in which one or more CORESETs are monitored by the UE. If the default beam is the beam associated with the first CORESET, which is associated with CORESET pool index 0, the scheduled PDSCH communication is transmitted to the UE from TRP1. If the default beam is the beam associated with the second CORESET, which is associated with CORESET pool index 1, the scheduled PDSCH communication is transmitted to the UE from TRP2.

As described above, in the case in which the UE is not configured with two default beams enabled for multi-DCI based multi-TRP, the default beam for a PDSCH communication may be a beam that follows the QCL assumption of the CORESET with the lowest CORESET ID in the latest monitored slot, irrespective of the CORESET pool index association. In this case, the default beam for the PDSCH communication is a function of the SS set monitoring periodicity associated with different CORESETs, and whether the default beam is from TRP1 or TRP2 depends on whether the CORESET with the lowest CORESET ID in the latest monitored slot (e.g., the latest slot in which an SS set for at least one CORESET is monitored for PDCCH) is associated with CORESET pool index 0 or CORESET pool index 1. Thus, the network may not have the flexibility or control to schedule a PDSCH communication with a scheduling offset less than the time duration for QCL from one of the TRPs in a given slot, irrespective of the SS set and CORESET configurations. This may result in reduced reliability for PDSCH communications and decreased network throughput due to reduced scheduling flexibility.

Some techniques and apparatuses described herein enable a UE to receive, in a first CORESET associated with a first CORESET pool index, first DCI that indicates a first TCI state to be applied starting from a first starting time associated with the first DCI, and receive, in a second CORESET associated with a second CORESET pool index, second DCI that indicates a second TCI state to be applied starting from a second starting time associated with the second DCI. The UE may receive third DCI that schedules a downlink communication, and the UE may receive the downlink communication using a default beam associated with the first CORESET pool index or the second CORESET pool index in connection with a default beam condition associated with the third DCI. In some aspects, a determination of whether the default beam is associated with the first CORESET pool index or the second CORESET pool index may be independent of SS set and CORESET configurations for the UE. As a result, flexibility for scheduling PDSCH communications with scheduling offset less than a time duration threshold from a first TRP or a second TRP may be increased, which may result in improved reliability of PDSCH communications and increased network throughput.

As indicated above, FIG. 10 is provided as an example. Other examples may differ from what is described with respect to FIG. 10.

Figure 11:
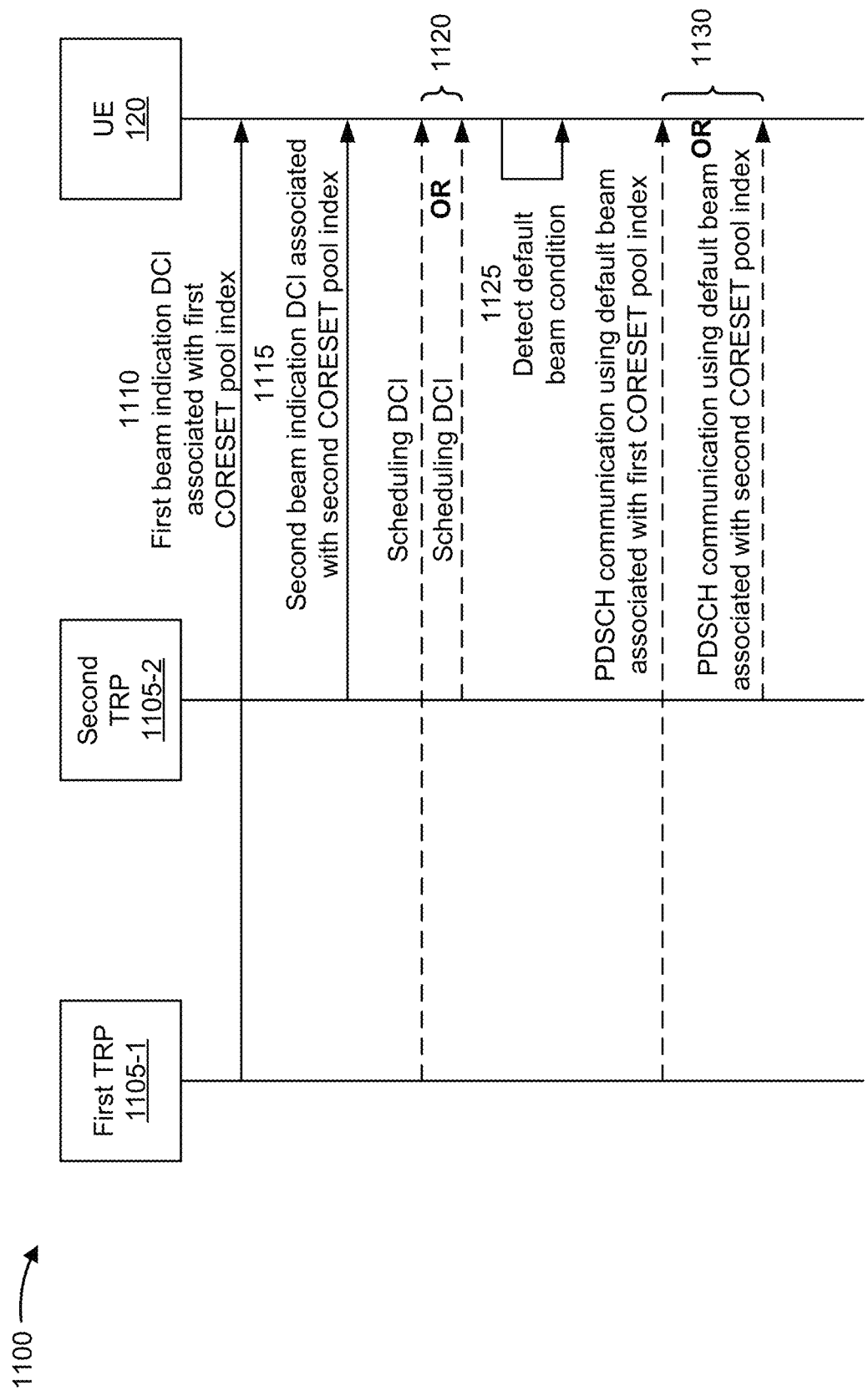
FIGS. 11-12 are diagrams illustrating examples associated with a default beam for multi-DCI based multi-TRP with a unified TCI, in accordance with the present disclosure.

FIG. 11 is a diagram illustrating an example 1100 associated with a default beam for multi-DCI based multi-TRP with a unified TCI, in accordance with the present disclosure. As shown in FIG. 11, example 1100 includes a first TRP 1105-1, a second TRP 1105-2, and a UE 120. In some aspects, the TRPs 1105 and UE 120 may be included in a wireless network, such as wireless network 100. The TRPs 1105 and the UE 120 may communicate via a wireless access link, which may include an uplink and a downlink.

In some aspects, the TRPs 1105 may communicate with the UE 120 using multi-DCI based multi-TRP communications. In some aspects, the first TRP 1105-1 may be associated with a first CORESET pool index (e.g., CORESET pool index 0), and the second TRP 1105-2 may be associated with a second CORESET pool index (e.g., CORESET pool index 1). The UE 120 may be configured with one or more CORESETs associated with the first CORESET pool index (e.g., CORESET pool index 0) and one or more CORESETs associated with the second CORESET pool index (e.g., CORESET pool index 1). In some aspects, the UE 120 may not be configured with respective default beams enabled for the first CORESET pool index and the second CORESET pool index (e.g., the UE 120 may not be configured with two default beams). For example, the RRC parameter enable DefaultTCI-StatePerCoresetPoolIndex may not be configured for the UE 120.

As shown in FIG. 11, and by reference number 1110, the UE 120 may receive first beam indication DCI (e.g., "first DCI") associated with the first CORESET pool index. The UE 120 may receive the first beam indication DCI in a CORESET associated with the first CORESET pool index. The first TRP 1105-1 may transmit the first beam indication DCI to the UE 120 in a PDCCH communication in a CORESET associated with the first CORESET pool index.

In some aspects, the first beam indication DCI may be DCI format 1_1 or 1_2, with or without scheduling information for a downlink communication (e.g., a PDSCH communication). The first beam indication DCI may indicate a first TCI state (e.g., a first unified TCI state) to be applied, for communications associated with the first CORESET pool index (e.g., communications between the first TRP 1105-1 and the UE 120), starting from a first starting time associated with the first beam indication DCI. In some aspects, the first starting time associated with the first beam indication DCI may be a first slot at least Y symbols after a last symbol of a PUCCH communication including HARQ-ACK feedback associated with the first beam indication DCI. For example, the number of symbols Y used to determine the starting time may be configured for the UE 120 via RRC signaling. In some aspects, the first TCI state indicated by the first beam indication DCI may be "sticky," and may be applied for downlink channels (e.g., PDSCH and PDCCH) and downlink reference signals (e.g., CSI-RS) (or for downlink and uplink channels and reference signals) associated with the first CORESET pool index until another beam indication DCI associated with the first CORESET pool index is transmitted to the UE 120 by the first TRP 1105-1.

The first beam indication DCI may include, in a TCI field of the first beam indication DCI, a TCI field codepoint that indicates a unified TCI state (e.g., a downlink TCI state or a joint downlink and uplink TCI state) to be applied starting from the first starting time for communications associated with the first CORESET pool index. The TCI field codepoint may map to an activated TCI state from a set of activated TCI states associated with the first CORESET pool index for the UE 120. For example, the TCI field codepoint included in the first beam indication may map to a joint downlink and uplink TCI state, a pair of TCI states including separate downlink and uplink TCI states, or a downlink only TCI state. The set of activated states associated with the first CORESET pool index may be indicated in a MAC-CE transmitted to the UE 120 from the first TRP 1105-1. In some aspects, the UE 120 may determine that the TCI field codepoint included in the first beam indication DCI maps to a TCI state from the set of activated TCI states associated with the first CORESET pool index based at least in part on receiving the first beam indication DCI in a CORESET associated with the first CORESET pool index.

As shown in FIG. 11, and by reference number 1115, the UE 120 may receive second beam indication DCI (e.g., "second DCI") associated with the second CORESET pool index. The UE 120 may receive the second beam indication DCI in a CORESET associated with the second CORESET pool index. The second TRP 1105-2 may transmit the second beam indication DCI to the UE 120 in a PDCCH communication in a CORESET associated with the second CORESET pool index.

In some aspects, the second beam indication DCI may be DCI format 1_1 or 1_2, with or without scheduling information for a downlink communication (e.g., a PDSCH communication). The second beam indication DCI may indicate a second TCI state (e.g., a second unified TCI state) to be applied, for communications associated with the second CORESET pool index (e.g., communications between the second TRP 1105-2 and the UE 120), starting from a second starting time associated with the second beam indication DCI. In some aspects, the second starting time associated with the second beam indication DCI may be a first slot at least Y symbols after a last symbol of a PUCCH communication including HARQ-ACK feedback associated with the second beam indication DCI. In some aspects, the second TCI state indicated by the second beam indication DCI may be "sticky," and may be applied for downlink channels (e.g., PDSCH and PDCCH) and downlink reference signals (e.g., CSI-RS) (or for downlink and uplink channels and reference signals) associated with the second CORESET pool index until another beam indication DCI associated with the second CORESET pool index is transmitted to the UE 120 by the second TRP 1105-2.

The second beam indication DCI may include, in a TCI field of the second beam indication DCI, a TCI field codepoint that indicates a unified TCI state (e.g., a downlink TCI state or a joint downlink and uplink TCI state) to be applied starting from the second starting time for communications associated with the second CORESET pool index. The TCI field codepoint may map to an activated TCI state from a set of activated TCI states associated with the second CORESET pool index for the UE 120. For example, the TCI field codepoint included in the second beam indication may map to a joint downlink and uplink TCI state, a pair of TCI states including separate downlink and uplink TCI states, or a downlink only TCI state. The set of activated states associated with the second CORESET pool index may be indicated in a MAC-CE transmitted to the UE 120 from the second TRP 1105-2. In some aspects, the UE 120 may determine that the TCI field codepoint included in the second beam indication DCI maps to a TCI state from the set of activated TCI states associated with the second CORESET pool index based at least in part on receiving the second beam indication DCI in a CORESET associated with the second CORESET pool index.

As further shown in FIG. 11, and by reference number 1120, the UE 120 may receive scheduling DCI (e.g., "third DCI") that schedules a downlink communication (e.g., a PDSCH communication) to be transmitted to the UE 120. For example, the first TRP 1105-1 may transmit the scheduling DCI to the UE 120 in a CORESET associated with the first CORESET pool index, or the second TRP 1105-2 may transmit the scheduling DCI to the UE 120 in a CORESET associated with the second CORESET pool index.

As further shown in FIG. 11, and by reference number 1125, the UE 120 may detect a default beam condition associated with the scheduling DCI. The default beam condition associated with the scheduling DCI may be a condition that triggers the use of a default beam for receiving the scheduled downlink communication (e.g., PDSCH communication) by the UE 120.

In some aspects, the UE 120 may detect the default beam condition in connection with a determination that a scheduling offset between the scheduling DCI and the scheduled downlink communication (e.g., PDSCH communication) is less than a time duration threshold. In some aspects, the time duration threshold may be the time duration for QCL (e.g., time DurationforQCL). For example, when QCL-TypeD is used (e.g., in FR2), the UE 120 may detect the default beam condition in connection with a determination that the scheduling offset between the scheduling DCI and the scheduled downlink communication (e.g., PDSCH communication) is less than the time duration for QCL (e.g., timeDurationForQCL). The time duration for QCL (e.g., timeDurationForQCL) may be a time duration indicated in or configured based at least in part on UE capability information for the UE 120.

As further shown in FIG. 11, and by reference number 1130, the UE 120 may receive the scheduled downlink communication (e.g., PDSCH communication) using a default beam associated with the first CORESET pool index or the second CORESET pool index. When the default beam for the scheduled downlink communication is a beam associated with the first CORESET pool index, the first TRP 1105-1 may transmit the scheduled downlink communication to the UE 120, and the UE 120 may receive the scheduled downlink communication from the first TRP 1105-1, using the default beam. When the default beam for the scheduled downlink communication is a beam associated with the second CORESET pool index, the second TRP 1105-2 may transmit the scheduled downlink communication to the UE 120, and the UE 120 may receive the scheduled downlink communication from the second TRP 1105-2, using the default beam.

The UE 120, in connection with detecting the default beam condition associated with the scheduling DCI, may determine the default beam to use to receive the downlink communication (e.g., PDSCH communication) scheduled by the scheduling DCI. In some aspects, the UE 120 may not be configured with respective beams enabled for the first CORESET pool index and the second CORESET pool index. In some aspects, the default beam may be a latest indicated beam associated with a fixed CORESET pool index value. That is, the default beam may be a beam corresponding to a latest indicated TCI state associated with a fixed CORESET pool index. In this case, the fixed CORESET pool index may the first CORESET pool index or the second CORESET pool index. For example, the fixed CORESET pool index may be the first CORESET pool index, and the latest indicated TCI state associated with the first CORESET pool index may be the first TCI state indicated in the first beam indication DCI. In this case, the default beam may be a beam associated with the first TCI state indicated in the first beam indication DCI. In another example, the fixed CORESET pool index may be the second CORESET pool index, and the latest indicated TCI state associated with the second CORESET pool index may be the second TCI state indicated in the second beam indication DCI. In this case, the default beam may be a beam associated with the second TCI state indicated in the second beam indication DCI. In aspects in which the default beam is the latest indicated beam associated with the fixed CORESET pool index, the default beam will be associated with the same TRP in all slots (e.g., the TRP associated with the fixed CORESET pool index). In some aspects, the fixed CORESET pool index may be specified in a wireless communication standard (e.g., a 3GPP standard) or configured for the UE 120 (e.g., via RRC signaling). In some aspects, the fixed CORESET pool index may be CORESET pool index 0.

In some aspects, the default beam may be a beam associated with a CORESET with a lowest CORESET identifier among one or more CORESETs associated with a fixed CORESET pool index monitored in a latest slot in which at least one CORESET associated with the fixed CORESET pool index is monitored. In this case, the UE 120 may consider only CORESETs associated with the fixed CORESET pool index when determining the lowest CORESET ID among the monitored CORESET. In this way, the default beam is always associated with the same TRP (e.g., the TRP associated with the fixed CORESET pool index). The fixed CORESET pool index may be the first CORESET pool index or the second CORESET pool index. In some aspects, the fixed CORESET pool index may be specified in a wireless communication standard (e.g., a 3GPP standard) or configured for the UE 120 (e.g., via RRC signaling).

In some aspects, the UE 120 may determine whether the default beam is associated with the first CORESET pool index or the second CORESET pool index based at least in part on a pattern in a time domain. For example, the UE 120 may compare a slot in which the downlink communication is scheduled with the pattern in the time domain to determine whether the default beam for the downlink communication is associated with the first CORESET pool index or the second CORESET pool index. In some aspects, the pattern in the time domain for determining whether the default beam is associated with the first CORESET pool index or the second CORESET pool index may be independent with respect to the configuration of search space sets for CORESETs associated with the first CORESET pool index and the second CORESET pool index. In some aspects, the pattern may be a slot-level pattern that identifies a first set of slots in which the default beam is associated with the first CORESET pool index and a second set of slots in which the default beam is associated with the second CORESET pool index. The slot-level pattern may be based at least in part on a slot number. For example, the default beam for a downlink communication (e.g., PDSCH communication) may be associated with the first CORESET pool index (e.g., CORESET pool index 0) in even slots and associated with the second CORESET pool index (e.g., CORESET pool index 1) in odd slots. In some aspects, the slot-level pattern may be based at least in part on an absolute slot number, and in some aspects, the slot-level pattern may be based at least is part on relative slot number relative to a slot in which a beam indication with a given CORESET pool index is applied (e.g., relative to a slot in which the first TCI state or the second TCI state is applied).

In some aspects, the time domain (e.g., slot-level) pattern for determining whether the default beam is associated with the first CORESET pool index or the second CORESET pool index may be configured for the UE 120 via RRC signaling. For example, the UE 120 may receive a configuration of the pattern in one or more RRC messages (e.g., from the first TRP 1105-1 and/or the second TRP 1105-2) that indicate a first set of slots in which the default beam is associated with the first CORESET pool index and/or a second set of slots in which the default beam is associated with the second CORESET pool index. In some aspects, a pattern of the slots in which the default beam is associated with the first CORESET pool index and a pattern of the slots in which the default beam is associated with the second CORESET pool index may be separately configured for the UE 120 (e.g., in separate RRC messages from the first TRP 1105-1 and the second TRP 1105-2). In some aspects, the pattern of slots for the default beam may be configured for one CORESET pool index (e.g., CORESET pool index 1) (e.g., in an RRC message from the corresponding TRP), and the UE 120 may determine that the default beam is associated with the other CORESET pool index (e.g., CORESET pool index 0) in slots not included in the configured pattern of slots.

In some aspects, that pattern for determining whether the default beam is associated with the first CORESET pool index or the second CORESET pool index may be indicated in a MAC-CE that indicates the set of activated TCI states for the at least one of the first CORESET pool index or the second CORESET pool index. In this case, the pattern may be common to all TCI field codepoints indicated in the MAC-CE, and independent of the beam indication DCI and the specific TCI codepoint included in the beam indication DCI. For example, the UE 120 may receive an indication of a pattern of slots in which the default beam is associated with the first CORESET pool index in a MAC-CE (e.g., transmitted by the first TRP 1105-1) that indicates the set of activated TCI states associated with the first CORESET pool index. Additionally, or alternatively, the UE 120 may receive an indication of a pattern of slots in which the default beam is associated with the second CORESET pool index in a MAC-CE (e.g., transmitted by the second TRP 1105-2) that indicates the set of activated TCI states associated with the second CORESET pool index.

In some aspects, the pattern of slots in which the default beam is associated with a CORESET pool index may be indicated as part of the TCI codepoint in the beam indication DCI associated with that CORESET pool index. In this case, the MAC-CE that indicates the set of activated TCI states associated with that CORESET pool index may indicate a set of TCI field codepoints and a mapping between each TCI field codepoints, of the set of TCI field codepoints, and a respective TCI state and pattern of slots for which the default beam is associated with that CORESET pool index. For example, the first beam indication DCI may include an indication of a TCI codepoint that indicates the first TCI state and a pattern for a first set of slots in which the default beam is associated with the first CORESET pool index. In this case, the UE 120 may receive a MAC-CE (e.g., from the first TRP 1105-1) that indicates a set of TCI codepoints for the first CORESET pool index and a mapping between each TCI codepoint of the set of TCI codepoints for the first CORESET pool index and a respective TCI state and pattern combination. Additionally, or alternatively, the second beam indication DCI may include an indication of a TCI codepoint that indicates the second TCI state and a pattern for a second set of slots in which the default beam is associated with the second CORESET pool index. In this case, mappings between TCI codepoints for the second CORESET pool index and respective TCI state and pattern combinations may be included in the MAC-CE that indicates the set of activated TCI states associated with the second CORESET pool index.

In some aspects, the UE 120 may receive separate indications (e.g., via RRC signaling, MAC-CE, or DCI) of a pattern of slots in which the default beam is associated with the first CORESET pool index and a pattern of slots in which the default beam is associated with the second CORESET pool index. In some aspects, the UE 120 may receive an indication (e.g., via RRC signal, MAC-CE, or DCI) of a pattern of slots for which the default beam is associated with one CORESET pool index, and the UE 120 may determine that the default beam is associated with the other CORESET pool index in slots not included in indicated the pattern of slots.

In a case in which the UE 120 determines, based at least in part on the pattern in the time domain, that the default beam for the scheduled downlink communication (e.g., PDSCH communication) is associated with the first CORESET pool index, the default beam may a beam associated with the first TCI state indicated in the first beam information (e.g., the latest indicated TCI state in beam forming DCI associated the first CORESET pool index). In a case in which the UE 120 determines, based at least in part on the pattern in the time domain, that the default beam for the scheduled downlink communication (e.g., PDSCH communication) is associated with the second CORESET pool index, the default beam may a beam associated with the second TCI state indicated in the second beam information (e.g., the latest indicated TCI state in beam forming DCI associated the second CORESET pool index).

As described above, the UE 120 may receive, in a first CORESET associated with a first CORESET pool index, first DCI that indicates a first TCI state to be applied starting from a first starting time associated with the first DCI, and the UE 120 may receive, in a second CORESET associated with a second CORESET pool index, second DCI that indicates a second TCI state to be applied starting from a second starting time associated with the second DCI. The UE 120 may receive third DCI that schedules a downlink communication, and the UE 120 may receive the downlink communication using a default beam associated with the first CORESET pool index or the second CORESET pool index in connection with a default beam condition associated with the third DCI. In some aspects, a determination of whether the default beam is associated with the first CORESET pool index or the second CORESET pool index may be independent of SS set and CORESET configurations for the UE 120. As a result, flexibility for scheduling PDSCH communications with scheduling offset less than a time duration threshold from a first TRP or a second TRP may be increased, which may result in improved reliability of PDSCH communications and increased network throughput.

As indicated above, FIG. 11 is provided as an example. Other examples may differ from what is described with respect to FIG. 11.

Figure 12:
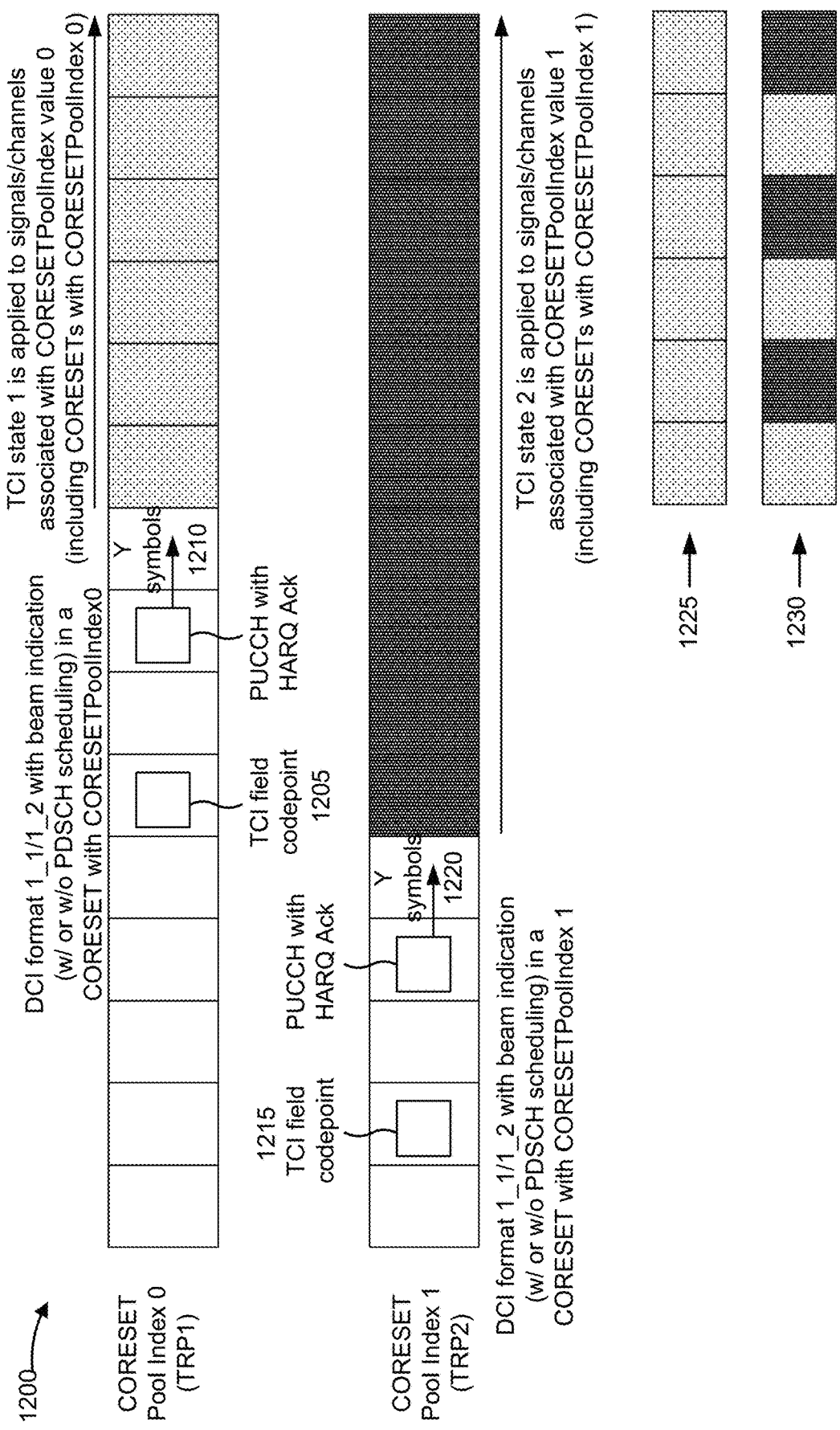

FIG. 12 is a diagram illustrating an example 1200 associated with a default beam for multi-DCI based multi-TRP with a unified TCI, in accordance with the present disclosure. As shown in FIG. 12, example 1200 includes multi-DCI based multi-TRP communications between a UE, a first TRP (TRP1), and a second TRP (TRP2). TRP1 may be associated with a first CORESET pool index (CORESET pool index 0), and TRP2 may be associated with a second CORESET pool index (CORESET pool index 1). The UE may be configured without respective default beams (e.g., two default beams) enabled for CORESET pool index 0 and CORESET pool index 1.

As shown in FIG. 12, and by reference number 1205, the UE may receive, from TRP1, first beam indication DCI that includes a TCI field codepoint that indicates a first TCI state (e.g., TCI state 1) to be applied to channels and signals associated with CORESET pool index 0 (e.g., for communications between TRP1 and the UE) starting from a starting time associated with the first beam indication DCI. The UE may receive the first beam indication DCI in a CORESET associated with CORESET pool index 0. The first beam indication DCI may be DCI format 1_1 or 1_2, with or without PDSCH scheduling. The TCI field codepoint may map to a TCI state (e.g., TCI state 1), from a set of activated TCI states associated with CORESET pool index 0 for the UE. As shown by reference number 1210, the UE may apply TCI state 1 (e.g., the TCI state indicated in the first beam indication DCI) starting in a first slot that is at least a configured number (Y) of symbols after a last symbol of a PUCCH communication carrying HARQ-ACK feedback for the first beam indication DCI. The UE may apply TCI state 1 to multiple downlink and/or uplink channels and reference signals associated with CORESET pool index 0 (e.g., including CORESETs associated with CORESET pool index 0). For example, the UE may apply TCI state 1 to downlink signals and channels (and uplink signals and channels, in some examples) associated with CORESET pool index 0 from the starting time associated with the first beam indication DCI until the UE receives an indication of a different TCI state in another beam indication DCI associated with CORESET pool index 0.

As shown by reference number 1215, the UE may receive, from TRP2, second beam indication DCI that includes a TCI field codepoint that indicates a second TCI state (e.g., TCI state 2) to be applied to channels and signals associated with CORESET pool index 1 (e.g., for communications between TRP2 and the UE) starting from a starting time associated with the second beam indication DCI. The UE may receive the second beam indication DCI in a CORESET associated with CORESET pool index 1. The second beam indication DCI may be DCI format 1_1 or 1_2, with or without PDSCH scheduling. The TCI field codepoint may map to a TCI state (e.g., TCI state 2), from a set of activated TCI states associated with CORESET pool index 1 for the UE. As shown by reference number 1220, the UE may apply TCI state 2 (e.g., the TCI state indicated in the second beam indication DCI) starting in a first slot that is at least a configured number (Y) of symbols after a last symbol of a PUCCH communication carrying HARQ-ACK feedback for the second beam indication DCI. The UE may apply TCI state 2 to multiple downlink and/or uplink channels and reference signals associated with CORESET pool index 1 (e.g., including CORESETs associated with CORESET pool index 1). For example, the UE may apply TCI state 2 to downlink signals and channels (and uplink signals and channels, in some examples) associated with CORESET pool index 1 from the starting time associated with the second beam indication DCI until the UE receives an indication of a different TCI state in another beam indication DCI associated with CORESET pool index 1.

The UE may receive, from TRP1 or TRP2, scheduling DCI (e.g., DCI format 1_1 or 1_2) that schedules a PDSCH communication to the UE. The UE may detect a default beam condition associated with the scheduling DCI. For example, in a case in which QCL-TypeD is used (e.g., in FR2), the UE may detect the default beam condition when the scheduling offset between the scheduling DCI and the scheduled PDSCH communication is less than a time duration for QCL (e.g., timeDurationForQCL). The UE, in connection with detecting the default beam condition, may receive the scheduled PDSCH communication using a default beam. In some aspects, the UE may not be configured with two default beams (e.g., respective default beams for CORESET pool index 0 and CORESET pool index 1), and the UE may determine the default beam to use for receiving the scheduled PDSCH communication. For example, the UE may determine whether the beam is associated with CORESET pool index 0 (e.g., associated with TRP1) of CORESET pool index 1 (e.g., associated with TRP2).

In some aspects, the default beam for the scheduled PDSCH communication may be a latest indicated beam associated with a fixed CORESET pool index value. As shown by reference number 1225, in one example, the default beam for a PDSCH communication scheduled in a given slot may be a beam associated with the latest indicated TCI state associated with CORESET pool index 0 (e.g., TCI state 1 indicated in the first beam indication DCI).

In some aspects, the UE may determine whether the default beam, for a PDSCH communication scheduled in a given slot, is associated with CORESET pool index 0 or CORESET pool index 1 based at least in part on a pattern in the time domain. As shown by reference number 1230, a slot-level pattern indicates a first set of slots in which the default beam is associated with CORESET pool index 0 and a second set of slots in which the default beam is associated with CORESET pool index 1. In the first set of slots, in which the default beam is associated with CORESET pool index 0, the default beam may be a beam associated with the latest indicated TCI state associated with CORESET pool index 0 (e.g., TCI state 1 indicated in the first beam indication DCI). In the second set of slots, in which the default beam is associated with CORESET pool index 1, the default beam may be a beam associated with the latest indicated TCI state associated with CORESET pool index 1 (e.g., TCI state 2 indicated in the second beam indication DCI).

As indicated above, FIG. 12 is provided as an example. Other examples may differ from what is described with respect to FIG. 12.

"Cross-carrier" scheduling refers to DCI carried in one CC scheduling one or more communications on another CC. For example, cross-carrier scheduling may be used to schedule PDSCH communications, PUSCH communications, and/or reference signal transmissions (e.g., for downlink and/or uplink reference signals). The CC in which the DCI is carried may be referred to as the "scheduling CC," and the CC in which a communication is scheduled may be referred to as the "scheduled CC." In some cases, a scheduling CC may be used to carry DCI that schedules communications on multiple different scheduled CCs. With cross-carrier scheduling for PDSCH communications, the scheduling DCI/CORESET and the scheduled PDSCH are in different CCs, and the scheduled CC may not be configured with any CORESET, as the UE may not monitor for PDCCH on the scheduled CC. In this case, the default beam for a PDSCH scheduled in the scheduled CC cannot be determined from latest monitored CORESETs in the scheduled CC.

In some examples, for a PDSCH scheduled with cross-carrier scheduling, the default beam for a PDSCH communication (both in cases in which the TCI field is not present in the scheduling DCI and in cases in which the scheduling offset is less than the time duration for QCL), may be a beam corresponding to the activated TCI state with the lowest TCI state ID (e.g., among the set of TCI states activated by a MAC-CE). That is the UE may obtain the QCL assumption for the default beam for a scheduled PDSCH communication from the activated TCI state with the lowest TCI state ID applicable to the PDSCH communication in the active BWP of the scheduled CC.

In some examples, in the case of multi-DCI based multi-TRP with cross carrier scheduling, when a UE is configured with two default beams enabled (e.g., when enableDefault-TCI-StatePerCoresetPoolIndex is configured for the UE), the default beam for a PDSCH communication associated with a CORESET pool index value may be determined based at least in part on the activated TCI state with the lowest TCI state ID among the activated TCI states for the that CORESET pool index value. For example, a default beam for a PDSCH communication associated with CORESET pool index 0 may be a beam associated with the activated TCI state with the lowest TCI state ID among the active TCI states for CORESET pool index 0. Similarly, a default beam for a PDSCH communication associated with CORESET pool index 1 may be a beam associated with the activated TCI state with the lowest TCI state ID among the active TCI states for CORESET pool index 1. However, when a DCI-based beam indication is used in the unified TCI framework, the UE may start applying a beam associated with an indicated TCI state, from the set of activated TCI states, to downlink channels and reference signals (and/or uplink channels and reference signals), and continue applying the same beam until another beam indication DCI is received. In this case, the beam indicated by the beam indication DCI (e.g., DCI format 1_1/1_2 with or without a downlink assignment) may not be the activated TCI state with the lowest TCI state ID. Accordingly, in cases in which the unified TCI framework is used for DCI-based beam indications in multi-DCI based multi-TRP with cross-carrier scheduling, a beam indication DCI may indicate a TCI state for a CORESET pool index other than the TCI state with the lowest TCI state ID among the activated TCI states for the CORESET pool index. Thus, the default beam for a PDSCH communication associated with the CORESET pool index may be different from the beam that is being applied to downlink channels and reference signals. As a result, the UE may unnecessarily switch from the indicated beam for downlink communications to a different default beam in order to receive a scheduled PDSCH communication in cases in which the use of the default beam is triggered. This may increase power consumption by the UE and may decrease reliability of the PDSCH communication due to the UE using a default beam that is less reliable than the beam indicated in the beam indication DCI to receive the PDSCH communication.

Some techniques and apparatuses described herein enable, a UE to receive, in a first CC, first DCI that indicates a TCI state to be applied for communications associated with a CORESET pool index in a second CC starting from a first starting time associated with the first DCI. The UE may receive second DCI that indicates a second TCI state to be applied for communications associated with a second CORESET pool index in the second component carrier starting from a second starting time associated with the second DCI. The UE may receive, in the first component carrier, third DCI that schedules a downlink communication in the second component carrier. The UE may receive the downlink communication in the second component carrier using a default beam in connection with a default beam condition associated with the third DCI, and the default beam may be determined to be a beam associated with the first TCI state or a beam associated with the second TCI state based at least in part on whether the downlink communication is associated with the first CORESET pool index or the second CORESET pool index. In some aspects, the default beam may be a beam associated with the first TCI state when the default beam is associated with the first CORESET pool index, and the default beam may be a beam associated with the second TCI state when the default beam is associated with the second CORESET pool index. As a result, the UE may use a default beam associated with the DCI-based TCI state indication for a CORESET pool index, even when the TCI state indicated in the DCI is not the TCI state with the lowest TCI state ID among a set of activated TCI states for the CORESET pool index. Thus, the UE may avoid unnecessarily switching between an indicated beam for a CORESET pool index in a CC and a different default beam when receiving scheduled downlink communications, which may reduce power consumption by the UE and increase reliability of multi-TRP cross-carrier scheduled downlink communications to the UE.

Figure 13:
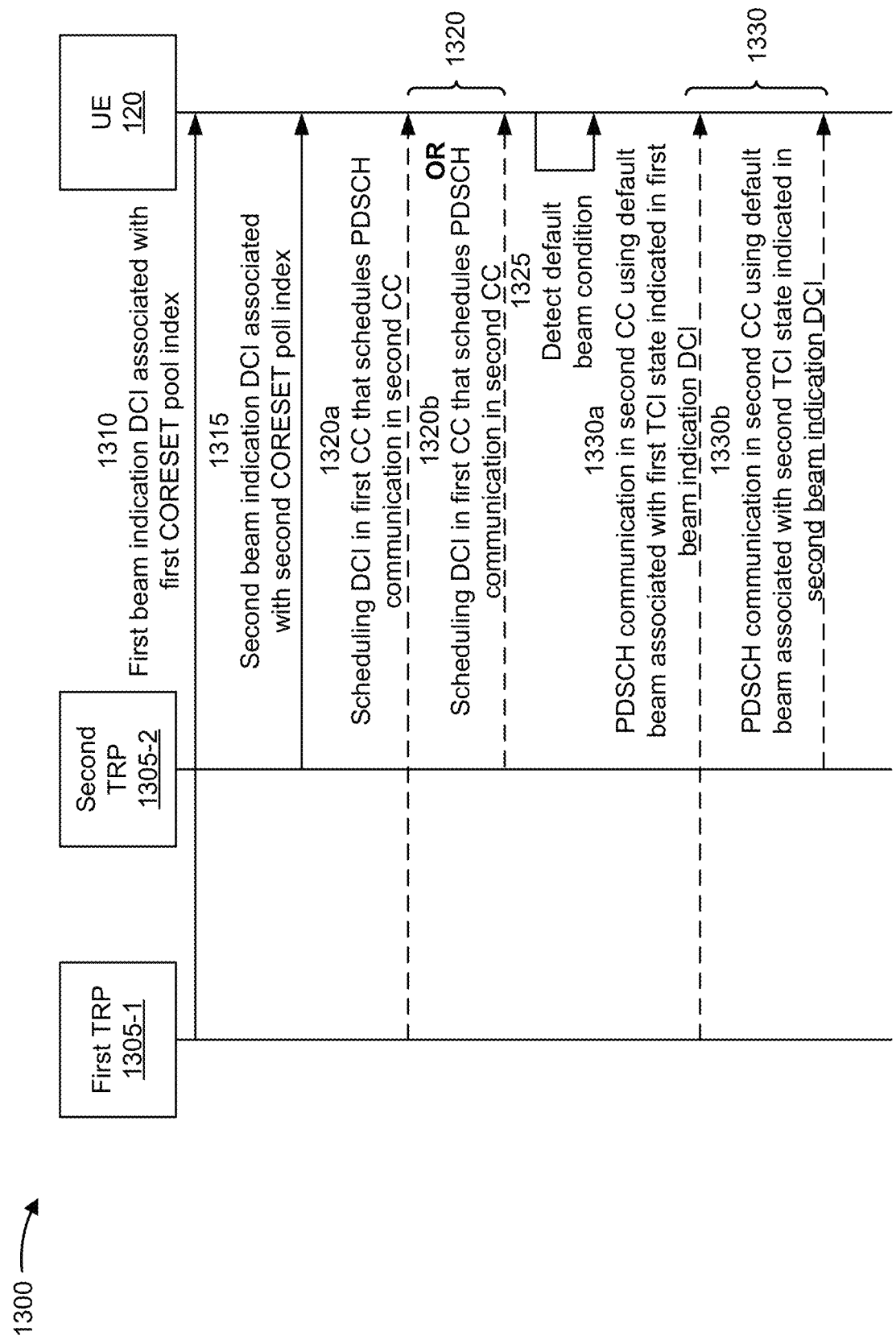
FIGS. 13-14 are diagrams illustrating examples associated with a default beam for multi-DCI based multi-TRP with cross-carrier scheduling and a unified TCI, in accordance with the present disclosure.

FIG. 13 is a diagram illustrating an example 1300 associated with a default beam for multi-DCI based multi-TRP with cross-carrier scheduling and a unified TCI, in accordance with the present disclosure. As shown in FIG. 13, example 1300 includes a first TRP 1305-1, a second TRP 1305-2, and a UE 120. In some aspects, the TRPs 1305 and UE 120 may be included in a wireless network, such as wireless network 100. The TRPs 1305 and the UE 120 may communicate via a wireless access link, which may include an uplink and a downlink.

In some aspects, the TRPs 1305 may communicate with the UE 120 using multi-DCI based multi-TRP communications. In some aspects, the first TRP 1305-1 may be associated with a first CORESET pool index (e.g., CORESET pool index 0), and the second TRP 1305-2 may be associated with a second CORESET pool index (e.g., CORESET pool index 1). The UE 120 may be configured with one or more CORESETs associated with the first CORESET pool index (e.g., CORESET pool index 0) and one or more CORESETs associated with the second CORESET pool index (e.g., CORESET pool index 1). In some aspects, the UE 120 may be configured with respective default beams enabled for the first CORESET pool index and the second CORESET pool index (e.g., the UE 120 may be configured with two default beams). For example, the RRC parameter enableDefault-TCI-StatePerCoresetPoolIndex may be configured for the UE 120.

A shown in FIG. 13, and by reference number 1310, the UE 120 may receive first beam indication DCI (e.g., "first DCI") associated with the first CORESET pool index. The first TRP 1305-1 may transmit the first beam indication DCI to the UE 120. In some aspects, the first beam indication DCI may be received by the UE 120 in a first CC, and the first beam indication DCI may indicate a first TCI state to be applied for communications associated with the first CORESET pool index in a second CC starting from a first starting time associated with the first beam indication DCI. The second CC may be a scheduled CC that is configured to enable with multi-DCI based multi-TRP communications. In some aspects, the first CC may be a scheduling CC, in which scheduling DCI may also be transmitted to the UE 120.

The first beam indication DCI may be DCI format 1_1 or 1_2 transmitted with or without scheduling information for a downlink communication (e.g., a PDSCH communication). In some aspects, the first starting time associated with the first beam indication DCI may be a first slot at least Y symbols after a last symbol of a PUCCH communication including HARQ-ACK feedback associated with the first beam indication DCI. For example, the number of symbols Y used to determine the starting time may be configured for the UE 120 via RRC signaling. In some aspects, the first TCI state indicated by the first beam indication DCI may be "sticky," and may be applied for downlink channels (e.g., PDSCH and PDCCH) and downlink reference signals (e.g., CSI-RS) (or for downlink and uplink channels and reference signals) associated with the first CORESET pool index in the second CC until the UE 120 receives another beam indication DCI that indicates a different TCI state to be applied to communications associated with the first CORESET pool index in the second CC.

The first beam indication DCI may include, in a TCI field of the first beam indication DCI, a TCI field codepoint that indicates a unified TCI state (e.g., a downlink TCI state or a joint downlink and uplink TCI state) to be applied starting from the first starting time for communications associated with the first CORESET pool index in the second CC. The TCI field codepoint may map to an activated TCI state from a set of activated TCI states associated with the first CORESET pool index for the UE 120. For example, the TCI field codepoint included in the first beam indication may map to a joint downlink and uplink TCI state, a pair of TCI states including separate downlink and uplink TCI states, or a downlink only TCI state. The set of activated states associated with the first CORESET pool index may be indicated in a MAC-CE transmitted to the UE 120 from the first TRP 1305-1.

As shown in FIG. 13, and by reference number 1315, the UE 120 may receive second beam indication DCI (e.g., "second DCI") associated with the second CORESET pool index. The second TRP 1305-1 may transmit the second beam indication DCI to the UE 120. In some aspects, the second beam indication DCI may be transmitted for the second TRP 1305-2 to the UE 120 in the first CC (e.g., in the same CC in which the first beam indication DCI is transmitted from the first TRP 1305-1 to the UE 120). In some aspects, the second beam indication DCI may be transmitted from the second TRP 1305-2 to the UE 120 in a third CC that is a different CC from the first CC in which the first beam indication DCI is transmitted from the first TRP 1305-1 to the UE 120 (and different from the second CC). The second beam indication DCI may indicate a second TCI state to be applied for communications associated with the second CORESET pool index in the second CC starting from a second starting time associated with the second beam indication DCI.

The second beam indication DCI may be DCI format 1_1 or 1_2 transmitted with or without scheduling information for a downlink communication (e.g., a PDSCH communication). In some aspects, the second starting time associated with the second beam indication DCI may be a first slot at least Y symbols after a last symbol of a PUCCH communication including HARQ-ACK feedback associated with the second beam indication DCI. In some aspects, the second TCI state indicated by the first beam indication DCI may be "sticky," and may be applied for downlink channels (e.g., PDSCH and PDCCH) and downlink reference signals (e.g., CSI-RS) (or for downlink and uplink channels and reference signals) associated with the second CORESET pool index in the second CC until the UE 120 receives another beam indication DCI that indicates a different TCI state to be applied to communications associated with second first CORESET pool index in the second CC.

The second beam indication DCI may include, in a TCI field of the second beam indication DCI, a TCI field codepoint that indicates a unified TCI state (e.g., a downlink TCI state or a joint downlink and uplink TCI state) to be applied starting from the second starting time for communications associated with the second CORESET pool index in the second CC. The TCI field codepoint may map to an activated TCI state from a set of activated TCI states associated with the second CORESET pool index for the UE 120. For example, the TCI field codepoint included in the first beam indication may map to a joint downlink and uplink TCI state, a pair of TCI states including separate downlink and uplink TCI states, or a downlink only TCI state. The set of activated states associated with the second CORESET pool index may be indicated in a MAC-CE transmitted to the UE 120 from the second TRP 1305-2.

As further shown in FIG. 13, and by reference number 1320, the UE 120 may receive, in the first CC, scheduling DCI (e.g., "third DCI") that schedules a downlink communication in the second CC. For example, the scheduling DCI may schedule a PDSCH communication for the UE 120 in the second CC. The first CC may be a scheduling CC for cross-carrier scheduling, and the second CC may be a scheduled CC for the downlink communication (e.g., PDSCH communication) scheduled by the scheduling DCI.

The UE 120 may receive the scheduling DCI from the first TRP 1305-1 or from the second TRP 1305-2. As shown by reference number 1320*a*, the first TRP 1305-1 may transmit scheduling DCI to the UE 120 in the first CC, and the scheduling DCI may schedule a PDSCH communication associated with the first CORESET pool index (e.g., a PDSCH communication from the first TRP 1305-1) in the second CC. As shown by reference number 1320*b*, the second TRP 1305-2 may transmit scheduling DCI to the UE 120 in the first CC, and the scheduling DCI may schedule a PDSCH communication associated with the second CORESET pool index (e.g., a PDSCH communication from the second TRP 1305-2) in the second CC.

As further shown in FIG. 13, and by reference number 1325, the UE 120 may detect a default beam condition associated with the scheduling DCI. The default beam condition associated with the scheduling DCI may be a condition that triggers the use of a default beam for receiving the scheduled downlink communication (e.g., PDSCH communication) by the UE 120.

In some aspects, the UE 120 may detect the default beam condition in connection with a determination that a scheduling offset between the scheduling DCI and the scheduled downlink communication (e.g., PDSCH communication) is less than a time duration threshold. The time duration threshold may be based at least in part on a time duration for QCL (e.g., timeDurationforQCL). The time duration for QCL (e.g., timeDurationForQCL) may be a time duration indicated in or configured based at least in part on UE capability information for the UE 120. In some aspects, the time duration threshold may be equal to the time duration for QCL (e.g., timeDurationForQCL). For example, when QCL-TypeD is used (e.g., in FR2), the UE 120 may detect the default beam condition in connection with a determination that the scheduling offset between the scheduling DCI and the scheduled downlink communication (e.g., PDSCH communication) is less than the time duration for QCL (e.g., timeDurationForQCL). In some aspects, in a case in which a first subcarrier spacing of the scheduling CC (e.g., the first CC) is different from a second subcarrier spacing of the scheduled CC (e.g., the second CC), the time duration threshold may be equal to a sum of the time duration for QCL (e.g., time DurationForQCL) and a delay associated the first subcarrier spacing and the second subcarrier spacing being different. For example, in a case in which a numerology ($\mu_{PDCCH}$) of the scheduling CC (e.g., the first CC) is less than a numerology ($\mu_{PDSCH}$) of the scheduled CC (e.g., the second CC), the time duration threshold may be equal to a sum of timeDurationForQCL and a delay of $d2^{\mu_{PDSCH}}/2^{\mu_{PDCCH}}$ where d may be specified in a wireless communication standard (e.g., a 3GPP standard) or configured via RRC configuration.

In some aspects, the UE 120 may detect the default beam condition in connection with a determination that a TCI field is absent from the scheduling DCI.

As further shown in FIG. 13, and by reference number 1330, the UE 120 may receive the scheduled downlink communication in the second CC (e.g., from the first TRP 1305-1 or the second TRP 1305-2) using a default beam associated with the first CORESET pool index or the second CORESET pool index. The UE 120, in connection with detecting the default beam condition associated with the scheduling DCI, may determine the default beam to use to receive the downlink communication (e.g., PDSCH communication) scheduled in the second CC by the scheduling DCI.

In some aspects, in a case in which the UE 120 is configured with respective default beams enabled for the first CORESET pool index and the second CORESET pool index (e.g., the UE 120 is configured with two default beams enabled), the UE 120 may determine whether the default beam is a beam associated with the first TCI state (indicated in the first beam indication DCI) or a beam associated with the second TCI state (indicated in the first beam indication DCI) based at least in part on whether the downlink communication (e.g., PDSCH communication) is associated with the first CORESET pool index or the second CORESET pool index. The first TCI state, indicated in the first beam indication DCI, may be the latest indicated TCI state associated with the first CORESET pool index to be applied in the second CC. The second TCI state, indicated in the second beam indication DCI, may be the latest indicated TCI state associated with the second CORESET pool index to be applied in the second CC.

In some aspects, for a downlink communication (e.g., PDSCH communication) associated with the first CORESET pool index (e.g., CORESET pool index 0) that is scheduled (e.g., via cross-carrier scheduling) by DCI received in a different CC (e.g., the first CC), the default beam for the downlink communication (e.g., in a case in which the default beam condition is detected) may be a beam associated with a latest indicated TCI state associated with the first CORESET pool index in beam indication DCI. In this case, the default beam for a downlink communication (e.g., PDSCH communication) associated with the first CORESET pool index (e.g., scheduled by scheduling DCI associated the first CORESET pool index) may be a beam associated with the first TCI state indicated in the first beam indication DCI. Because the default beam is associated with the first CORESET pool index, the downlink communication is transmitted to the UE 120 from the first TRP 1305-1. As shown by reference number 1330*a*, for a scheduled PDSCH communication associated with the first CORESET pool index, the first TRP 1305-1 may transmit the PDSCH communication, and the UE 120 may receive the PDSCH communication, in the second CC using a default beam associated with the first TCI state indicated in the first beam indication DCI.

In some aspects, for a downlink communication (e.g., PDSCH communication) associated with the second CORESET pool index (e.g., CORESET pool index 1) that is scheduled (e.g., via cross-carrier scheduling) by DCI received in a different CC (e.g., the first CC), the default beam for the downlink communication (e.g., in a case in which the default beam condition is detected) may be a beam associated with a latest indicated TCI state associated with the second CORESET pool index in beam indication DCI. In this case, the default beam for a downlink communication (e.g., PDSCH communication) associated with the second CORESET pool index (e.g., scheduled by scheduling DCI associated the second CORESET pool index) may be a beam associated with the second TCI state indicated in the second beam indication DCI. Because the default beam is associated with the second CORESET pool index, the downlink communication is transmitted to the UE 120 from the second TRP 1305-2. As shown by reference number 1330*b*, for a scheduled PDSCH communication associated with the second CORESET pool index, the second TRP 1305-2 may transmit the PDSCH communication, and the UE 120 may receive the PDSCH communication, in the second CC using a default beam associated with the second TCI state indicated in the second beam indication DCI.

In some aspects, in a case in which the UE 120 is not configured with two default beams enabled for multi-DCI based multi-TRP with cross-carrier scheduling, the UE 120 may determine the default beam for a downlink communication (e.g., PDSCH communication) scheduled via-cross carrier scheduling in a CC (e.g., the second CC) configured for multi-DCI based multi-TRP based at least in part on a latest indicated TCI state associated with a fixed CORESET pool index (e.g., the first CORESET pool index or the second CORESET pool index) or based at least in part on a latest indicated TCI state of associated with a CORESET pool index that is determined in accordance with a pattern in a time domain, similar to as described above in connection with FIG. 11.

As indicated above, FIG. 13 is provided as an example. Other examples may differ from what is described with respect to FIG. 13.

Figure 14:
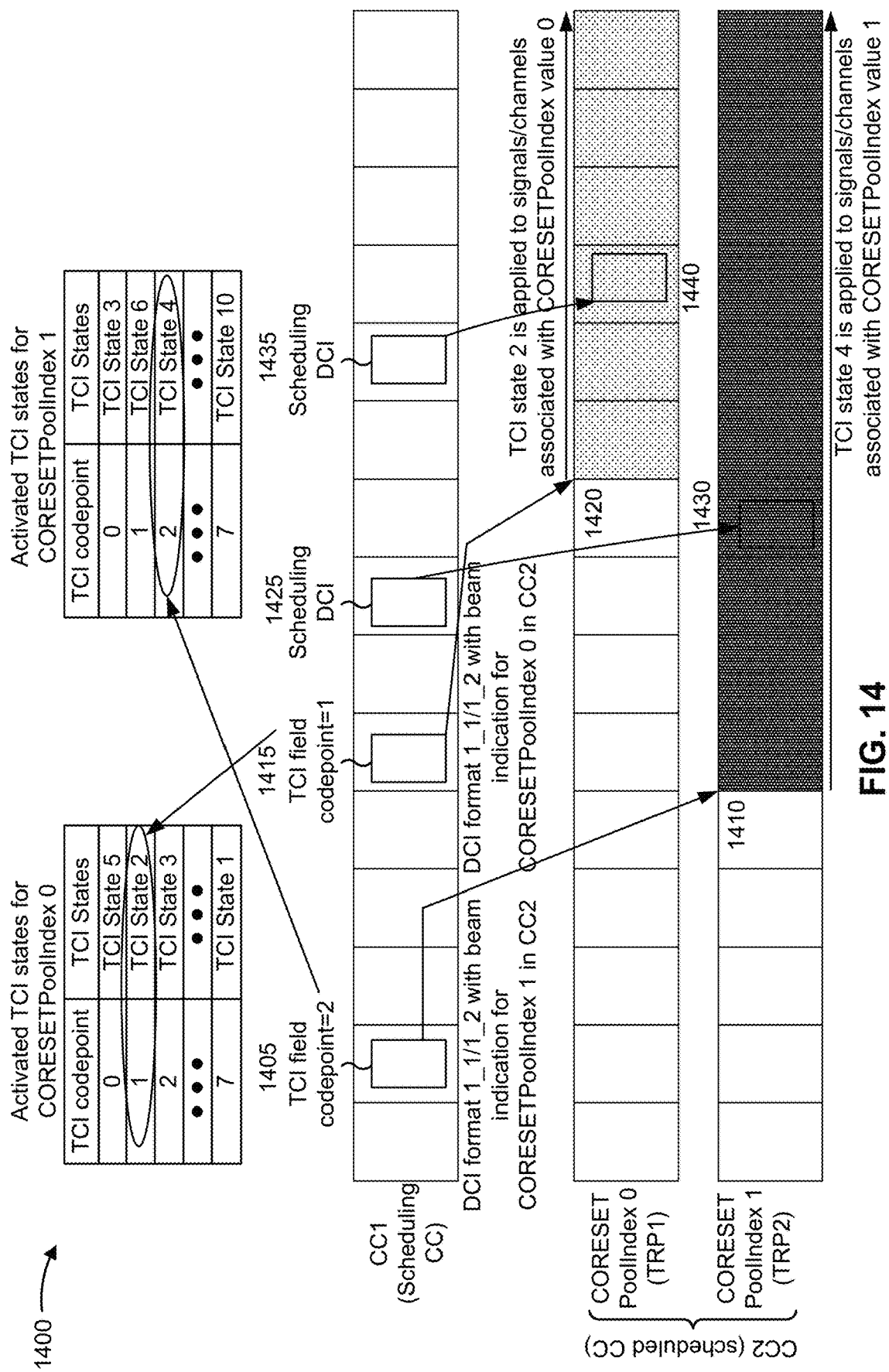

FIG. 14 is a diagram illustrating an example 1400 associated with a default beam for multi-DCI based multi-TRP with cross-carrier scheduling and a unified TCI, in accordance with the present disclosure. As shown in FIG. 14, example 1400 includes multi-DCI based multi-TRP communications between a UE, a first TRP (TRP1), and second TRP (TRP2). TRP1 may be associated with a first CORESET pool index (CORESET pool index 0), and TRP2 may be associated with a second CORESET pool index (CORESET pool index 1). The UE may be configured with respective default beams (e.g., two default beams) enabled for CORESET pool index 0 and CORESET pool index 1. A first CC (CC1) may be scheduling CC, and a second CC (CC2) may be a scheduled CC configured with cross carrier scheduling. CC2 may be configured for multi-DCI based multi-TRP communications associated with CORESET pool 0 and CORESET pool 1, and CC2 may be configured with unified TCI.

As shown in FIG. 14, the UE may receive beam indication DCI 1405 in CC1 that indicates a TCI state to be applied to downlink signals and channels (or to downlink and uplink signals and channels) associated with CORESET pool index 1 in CC2 starting from a starting time 1410 associated with the beam indication DCI 1405. The beam indication DCI 1405 may be DCI format 1_1/1_2 with or without PDSCH scheduling information. The beam indication DCI 1405 may indicate a TCI field codepoint that maps to a TCI state in a set of activated TCI states for the CORESET pool index 1. For example, as shown in FIG. 14, the beam indication DCI 1405 may indicate a TCI field codepoint of 2, which maps to TCI state 4. The starting time 1410 associated with the beam indication DCI 1405 may start at a first slot at least a configured number (Y) of symbols after a last symbol of a PUCCH communication that includes the HARQ-ACK feedback for the beam indication DCI 1405. The UE may start applying the TCI state (e.g., TCI state 4) indicated in the beam indication DCI 1405 at the start time 1410, and the UE may apply the indicated TCI state (e.g., TCI state 4) to multiple downlink signals and channels associated with CORESET pool index 1 in CC2. For example, the UE may apply the indicated TCI state (e.g., TCI state 4) to downlink signals and channels associated with CORESET pool index 1 in CC2 from the starting time 1410 until the UE receives another beam indication DCI including an indication of a different TCI state for communications associated with CORESET 1 in CC2.

As further shown in FIG. 14, the UE may receive beam indication DCI 1415 in CC1 that indicates a TCI state to be applied to downlink signals and channels (or to downlink and uplink signals and channels) associated with CORESET pool index 0 in CC2 starting from a starting time 1420 associated with the beam indication DCI 1415. The beam indication DCI 1415 may be DCI format 1_1/1_2 with or without PDSCH scheduling information. The beam indication DCI 1415 may indicate a TCI field codepoint that maps to a TCI state in a set of activated TCI states for the CORESET pool index 0. For example, as shown in FIG. 14, the beam indication DCI 1415 may indicate a TCI field codepoint of 1, which maps to TCI state 2. The starting time 1420 associated with the beam indication DCI 1415 may start at a first slot at least a configured number (Y) of symbols after a last symbol of a PUCCH communication that includes the HARQ-ACK feedback for the beam indication DCI 1415. The UE may start applying the TCI state (e.g., TCI state 2) indicated in the beam indication DCI 1415 at the start time 1420, and the UE may apply the indicated TCI state (e.g., TCI state 2) to multiple downlink signals and channels associated with CORESET pool index 0 in CC2. For example, the UE may apply the indicated TCI state (e.g., TCI state 2) to downlink signals and channels associated with CORESET pool index 0 in CC2 from the starting time 1420 until the UE receives another beam indication DCI including an indication of a different TCI state for communications associated with CORESET 0 in CC2.

As further shown in FIG. 14, the UE may receive scheduling DCI 1425 in CC1 that schedules a PDSCH communication 1430 associated with CORESET pool index 1 in CC2. The UE may detect a default beam condition associated with the scheduling DCI 1425. For example, a scheduling offset between the scheduling DCI 1425 and the scheduled PDSCH communication 1430 may be less than a time duration threshold (e.g., the scheduling offset may be less than time DurationforQCL), which may trigger the UE to receive the scheduled PDSCH communication 1430 using a default beam. In some aspects, because the PDSCH communication 1430 is associated with CORESET pool index 1, the default beam for the receiving the PDSCH communication 1430 may be a default beam associated with the TCI state (e.g., TCI state 4) indicated in the latest beam indication DCI 1405 for CORESET pool index 1 in CC2. The PDSCH communication 1430 may be transmitted from TRP2, and received by the UE, in CC2 using the default beam associated with TCI state 4.

As shown FIG. 14, the UE may use a beam associated with TCI state 4 as the default beam for receiving the PDSCH communication 1430 associated with CORESET pool index 1, because TCI state 4 was indicated (e.g., using the TCI field codepoint of 2) in the latest beam indication DCI 1405 for communications associated with CORESET pool index 1 in CC2. However, in the example of FIG. 14, TCI state 3 is the TCI state with the lowest TCI state ID among the set of activated TCI states for CORESET pool index 1. In some aspects, the UE may use the beam associated with the latest indicated TCI state (e.g., TCI 4) to be applied to communications associated with CORESET pool index 1 in CC2, even in a case in which the indicated TCI state (e.g., TCI state 4) is not the TCI state with the lowest TCI state ID (e.g., TCI state 3) among the activated TCI states for CORESET pool index 1.

As further shown in FIG. 14, the UE may receive scheduling DCI 1435 in CC1 that schedules a PDSCH communication 1440 associated with CORESET pool index 0 in CC2. The UE may detect a default beam condition associated with the scheduling DCI 1435. For example, a scheduling offset between the scheduling DCI 1435 and the scheduled PDSCH communication 1440 may be less than a time duration threshold (e.g., the scheduling offset may be less than timeDurationforQCL), which may trigger the UE to receive the scheduled PDSCH communication 1440 using a default beam. In some aspects, because the PDSCH communication 1440 is associated with CORESET pool index 0, the default beam for the receiving the PDSCH communication 1440 may be a default beam associated with the TCI state (e.g., TCI state 2) indicated in the latest beam indication DCI 1415 for CORESET pool index 0 in CC2. The PDSCH communication 1440 may be transmitted from TRP1, and received by the UE, in CC2 using the default beam associated with TCI state 2.

As shown FIG. 14, the UE may use a beam associated with TCI state 2 as the default beam for receiving the PDSCH communication 1440 associated with CORESET pool index 0, because TCI state 2 was indicated (e.g., using the TCI field codepoint of 1) in the latest beam indication DCI 1415 for communications associated with CORESET pool index 0 in CC2. However, in the example of FIG. 14, TCI state 1 is the TCI state with the lowest TCI state ID among the set of activated TCI states for CORESET pool index 0. In some aspects, the UE may use the beam associated with the latest indicated TCI state (e.g., TCI 2) to be applied to communications associated with CORESET pool index 0 in CC2, even in a case in which the indicated TCI state (e.g., TCI state 2) is not the TCI state with the lowest TCI state ID (e.g., TCI state 1) among the activated TCI states for CORESET pool index 0.

As indicated above, FIG. 14 is provided as an example. Other examples may differ from what is described with respect to FIG. 14.

Figure 15:
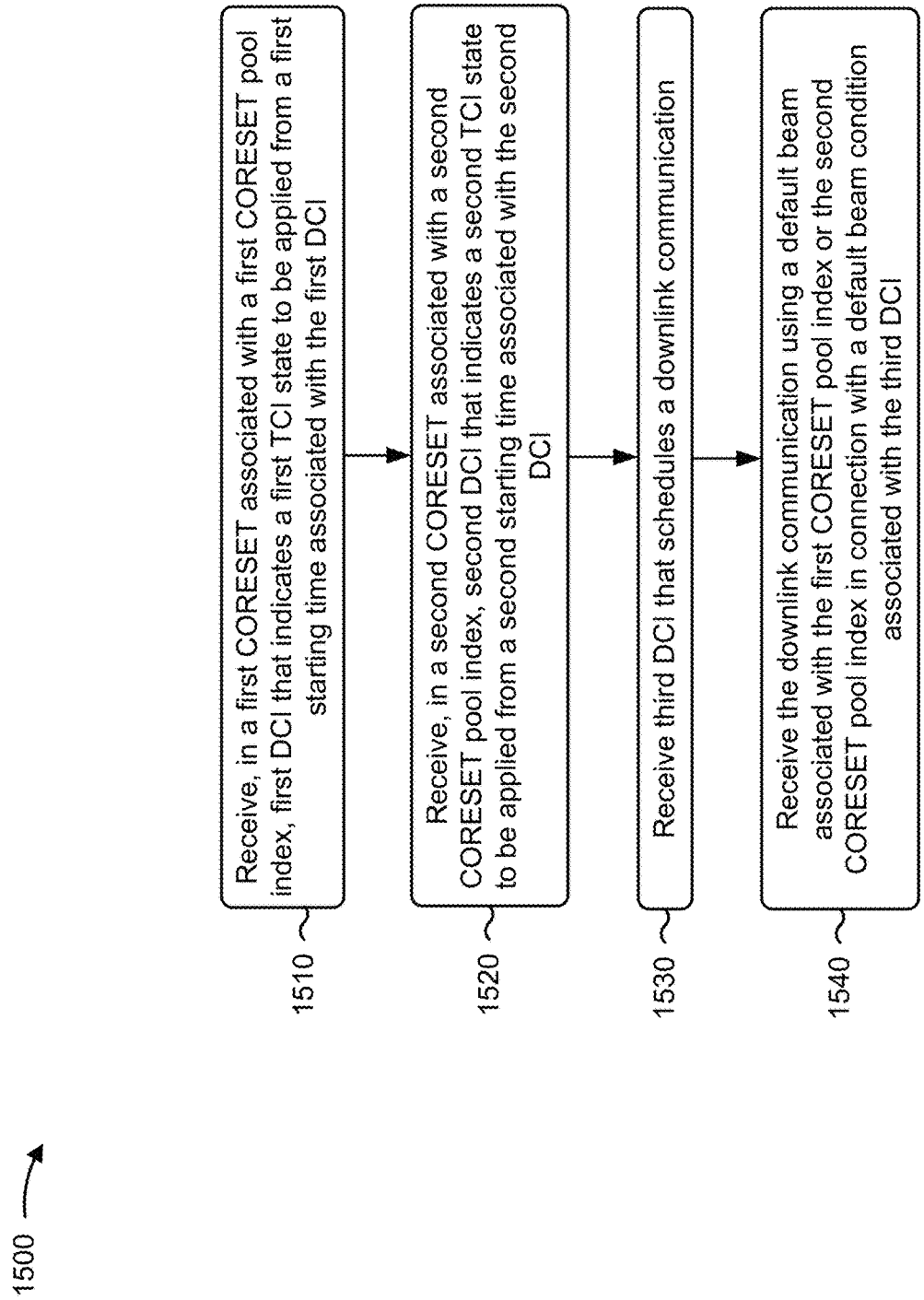
FIGS. 15-16 are diagrams illustrating example processes associated with a default beam for multi-DCI based multi-TRP with a unified TCI, in accordance with the present disclosure.

FIG. 15 is a diagram illustrating an example process 1500 performed, for example, by a UE, in accordance with the present disclosure. Example process 1500 is an example where the UE (e.g., UE 120) performs operations associated with a default beam for multi-DCI based multi-TRP with a unified TCI.

As shown in FIG. 15, in some aspects, process 1500 may include receiving, in a first CORESET associated with a first CORESET pool index, first DCI that indicates a first TCI state to be applied starting from a first starting time associated with the first DCI (block 1510). For example, the UE (e.g., using communication manager 140 and/or reception component 1802, depicted in FIG. 18) may receive, in a first CORESET associated with a first CORESET pool index, first DCI that indicates a first TCI state to be applied starting from a first starting time associated with the first DCI, as described above.

As further shown in FIG. 15, in some aspects, process 1500 may include receiving, in a second CORESET associated with a second CORESET pool index, second DCI that indicates a second TCI state to be applied starting from a second starting time associated with the second DCI (block 1520). For example, the UE (e.g., using communication manager 140 and/or reception component 1802, depicted in FIG. 18) may receive, in a second CORESET associated with a second CORESET pool index, second DCI that indicates a second TCI state to be applied starting from a second starting time associated with the second DCI, as described above.

As further shown in FIG. 15, in some aspects, process 1500 may include receiving third DCI that schedules a downlink communication (block 1530). For example, the UE (e.g., using communication manager 140 and/or reception component 1802, depicted in FIG. 18) may receive third DCI that schedules a downlink communication, as described above.

As further shown in FIG. 15, in some aspects, process 1500 may include receiving the downlink communication using a default beam associated with the first CORESET pool index or the second CORESET pool index in connection with a default beam condition associated with the third DCI (block 1540). For example, the UE (e.g., using communication manager 140 and/or reception component 1802, depicted in FIG. 18) may receive the downlink communication using a default beam associated with the first CORESET pool index or the second CORESET pool index in connection with a default beam condition associated with the third DCI, as described above.

Process 1500 may include additional aspects, such as any single aspect or any combination of aspects described below and/or in connection with one or more other processes described elsewhere herein.

In a first aspect, the UE is not configured with respective default beams enabled for the first CORESET pool index and the second CORESET pool index.

In a second aspect, receiving the downlink communication using the default beam associated with the first CORESET pool index or the second CORESET pool index in connection with the default beam condition associated with the third DCI includes receiving the downlink communication using the default beam associated with the first CORESET pool index or the second CORESET pool index in connection with a scheduling offset between the second DCI and the downlink communication being less than a time duration for QCL.

In a third aspect, the default beam is a beam corresponding to a latest indicated TCI state associated with a fixed CORESET pool index, and the fixed CORESET pool index is the first CORESET pool index or the second CORESET pool index.

In a fourth aspect, the fixed CORESET pool index is the first CORESET pool index and the latest indicated TCI state associated with the fixed CORESET pool index is the first TCI state.

In a fifth aspect, the default beam is a beam associated with a CORESET with a lowest CORESET identifier among one or more CORESETs associated with a fixed CORESET pool index monitored in a latest slot in which at least one CORESET associated with the fixed CORESET pool index is monitored, and the fixed CORESET pool index is the first CORESET pool index or the second CORESET pool index.

In a sixth aspect, the default beam is determined to be associated with the first CORESET pool index or the second CORESET pool index based at least in part on a slot in which the downlink communication is scheduled and a pattern in a time domain.

In a seventh aspect, the default beam is a beam associated with the first TCI state based at least in part on a determination that the default beam is associated with the first CORESET pool index, or the default beam is a beam associated with the second TCI state based at least in part on a determination that the default beam is associated with the second CORESET pool index.

In an eighth aspect, the pattern is a slot-level pattern that identifies a first set of slots in which the default beam is associated with the first CORESET pool index and a second set of slots in which the default beam is associated with the second CORESET pool index.

In a ninth aspect, the slot-level pattern is based at least in part on a slot number.

In a tenth aspect, the first set of slots includes slots with even slot numbers and the second set of slots includes slots with odd slot numbers.

In an eleventh aspect, the slot-level pattern is based at least in part on an absolute slot number or the slot-level pattern is based at least in part on a relative slot number relative to a slot in which the first TCI state or the second TCI state is applied.

In a twelfth aspect, process 1500 includes receiving an RRC message including a configuration of the pattern, and the configuration of the pattern indicates at least one of a first set of slots in which the default beam is associated with the first CORESET pool index or a second set of slots in which the default beam is associated with the second CORESET pool index.

In a thirteenth aspect, process 1500 includes receiving an indication of the pattern in a MAC-CE that indicates one or more active TCI states for at least one of the first CORESET pool index or the second CORESET pool index, and the indication of the pattern indicates at least one of a first set of slots in which the default beam is associated with the first CORESET pool index or a second set of slots in which the default beam is associated with the second CORESET pool index.

In a fourteenth aspect, the first DCI includes an indication of a TCI codepoint that indicates the first TCI state and a pattern for a first set of slots in which the default beam is associated with the first CORESET pool index.

In a fifteenth aspect, process 1500 includes receiving a MAC-CE that indicates one or more TCI codepoints for the first CORESET pool index and a mapping between each TCI codepoint of the one or more TCI codepoints for the first CORESET pool index and a respective TCI state and pattern combination.

In a sixteenth aspect, the second DCI includes an indication of a TCI codepoint that indicates the second TCI state and a pattern for a second set of slots in which the default beam is associated with the second CORESET pool index.

In a seventeenth aspect, the first CORESET pool index is associated with a first transmit receive point and the second CORESET pool index is associated with a second transmit receive point.

In an eighteenth aspect, the downlink communication scheduled by the third DCI is a PDSCH communication.

In a nineteenth aspect, the first TCI state is a TCI state to be applied for communications associated with the first CORESET pool index starting from the first starting time associated with the first DCI, and the second TCI state is a TCI state to be applied for communications associated with the second CORESET pool index starting from the second starting time associated with the second DCI.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
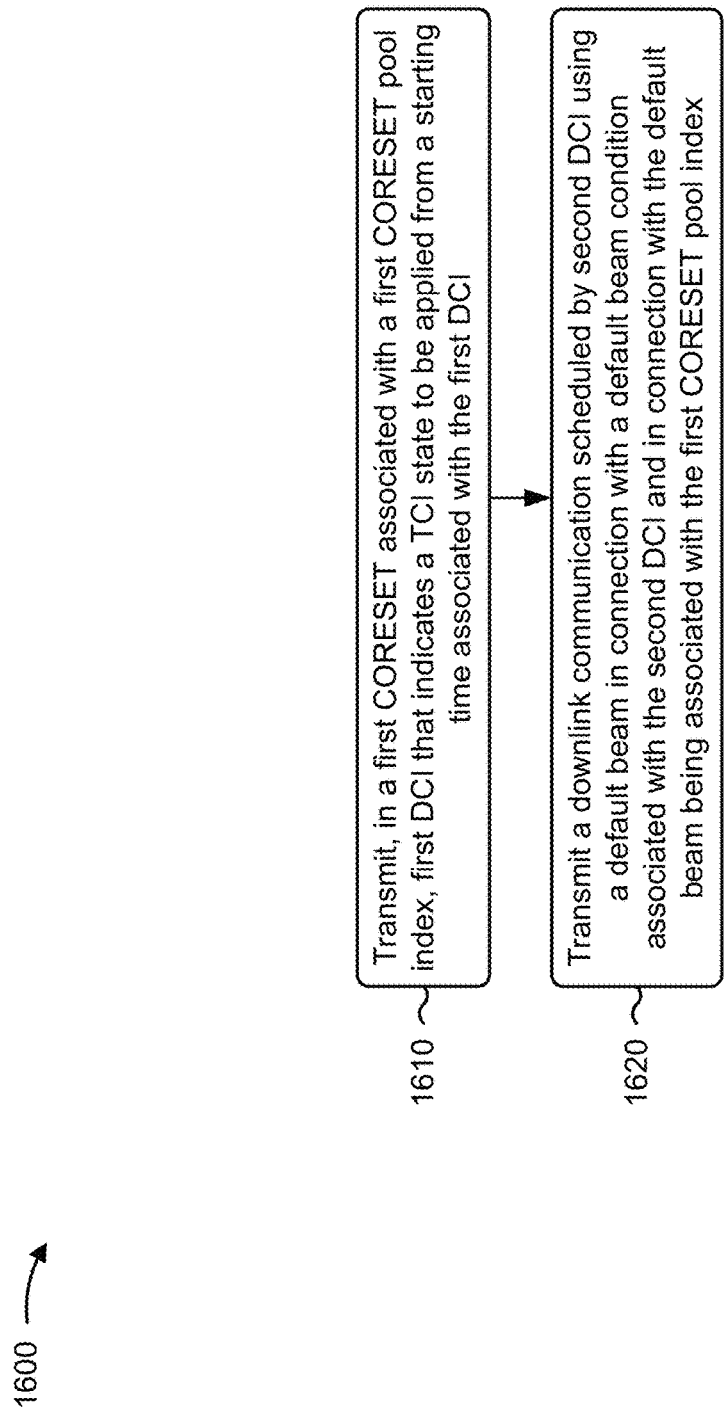

FIG. 16 is a diagram illustrating an example process 1600 performed, for example, by a network node, in accordance with the present disclosure. Example process 1600 is an example where the network node (e.g., TRP 1105, TRP 1305, base station 110, CU 310, DU 330, RU 340, or a combination thereof) performs operations associated with a default beam for multi-DCI based multi-TRP with unified TCI.

As shown in FIG. 16, in some aspects, process 1600 may include transmitting, in a first CORESET associated with a first CORESET pool index of multiple CORESET pool indexes configured for a UE, first DCI that indicates a TCI state to be applied starting from a starting time associated with the first DCI (block 1610). For example, the network node (e.g., using communication manager 1908 and/or transmission component 1904, depicted in FIG. 19) may transmit, in a first CORESET associated with a first CORESET pool index of multiple CORESET pool indexes configured for a UE, first DCI that indicates a TCI state to be applied starting from a starting time associated with the first DCI, as described above.

As further shown in FIG. 16, in some aspects, process 1600 may include transmitting a downlink communication scheduled by second DCI using a default beam in connection with a default beam condition associated with the second DCI and in connection with the default beam being associated with the first CORESET pool index (block 1620). For example, the network node (e.g., using communication manager 1908 and/or transmission component 1904, depicted in FIG. 19) may transmit a downlink communication scheduled by second DCI using a default beam in connection with a default beam condition associated with the second DCI and in connection with the default beam being associated with the first CORESET pool index, as described above.

Process 1600 may include additional aspects, such as any single aspect or any combination of aspects described below and/or in connection with one or more other processes described elsewhere herein.

In a first aspect, process 1600 includes transmitting the second DCI that schedules the downlink communication.

In a second aspect, alone or in combination with the first aspect, the UE is not configured with respective default beams enabled for the multiple CORESET indexes configured for the UE.

In a third aspect, alone or in combination with one or more of the first and second aspects, transmitting the downlink communication scheduled by second DCI using the default beam in connection with the default beam condition and in connection with the default beam being associated with the first CORESET pool index includes transmitting the downlink communication using the default beam in connection with a scheduling offset between the second DCI and the downlink communication being less than a time duration for QCL and in connection with the default beam being associated with the first CORESET pool index.

In a fourth aspect, alone or in combination with one or more of the first through third aspects, the default beam is a beam corresponding to a latest indicated TCI state associated with a fixed CORESET pool index of the multiple CORESET pool indexes configured for the UE, the fixed CORESET pool index is the first CORESET pool index, and the latest indicated TCI state associated with the fixed CORESET pool index is the TCI state indicated in the first DCI.

In a fifth aspect, alone or in combination with one or more of the first through fourth aspects, the default beam is a beam associated with a CORESET with a lowest CORESET identifier among one or more CORESETs associated with a fixed CORESET pool index monitored in a latest slot in which at least one CORESET associated with the fixed CORESET pool index is monitored, and the fixed CORESET pool index is the first CORESET pool index.

In a sixth aspect, alone or in combination with one or more of the first through fifth aspects, the default beam is determined to be associated with the first CORESET pool index or a second CORESET pool index, of the multiple CORESET pool indexes configured for the UE, based at least in part on a slot in which the downlink communication is scheduled and a pattern in a time domain.

In a seventh aspect, alone or in combination with one or more of the first through sixth aspects, the default beam is a beam associated with the TCI state indicated in the first DCI based at least in part on a determination that the default beam is associated with the first CORESET pool index.

In an eighth aspect, alone or in combination with one or more of the first through seventh aspects, the pattern is a slot-level pattern that identifies a first set of slots in which the default beam is associated with the first CORESET pool index and a second set of slots in which the default beam is associated with the second CORESET pool index.

In a ninth aspect, alone or in combination with one or more of the first through eighth aspects, the slot-level pattern is based at least in part on a slot number.

In a tenth aspect, alone or in combination with one or more of the first through ninth aspects, the first set of slots includes slots with even slot numbers and the second set of slots includes slots with odd slot numbers.

In an eleventh aspect, alone or in combination with one or more of the first through tenth aspects, the slot-level pattern is based at least in part on an absolute slot number, or the slot-level pattern is based at least in part on a relative slot number relative to a slot in which the TCI state indicated in the first DCI is applied.

In a twelfth aspect, alone or in combination with one or more of the first through eleventh aspects, process 1600 includes transmitting, to the UE, an RRC message including a configuration of the pattern, and the configuration of the pattern indicates at least one of a first set of slots in which the default beam is associated with the first CORESET pool index or a second set of slots in which the default beam is associated with the second CORESET pool index.

In a thirteenth aspect, alone or in combination with one or more of the first through twelfth aspects, process 1600 includes transmitting, to the UE, an indication of the pattern in a MAC-CE that indicates one or more activated TCI states for at least one of the first CORESET pool index or the second CORESET pool index, and the indication of the pattern indicates at least one of a first set of slots in which the default beam is associated with the first CORESET pool index or a second set of slots in which the default beam is associated with the second CORESET pool index.

In a fourteenth aspect, alone or in combination with one or more of the first through thirteenth aspects, the first DCI includes an indication of a TCI codepoint that indicates the TCI state and a pattern for a first set of slots in which the default beam is associated with the first CORESET pool index.

In a fifteenth aspect, alone or in combination with one or more of the first through fourteenth aspects, process 1600 includes transmitting, to the UE, a MAC-CE that indicates one or more TCI codepoints for the first CORESET pool index and a mapping between each TCI codepoint of the one or more TCI codepoints for the first CORESET pool index and a respective TCI state and pattern combination.

In a sixteenth aspect, alone or in combination with one or more of the first through fifteenth aspects, the first CORESET pool index is associated with a first transmit receive point and a second CORESET pool index, of the multiple CORESET pool indexes configured for the UE, is associated with a second transmit receive point.

In a seventeenth aspect, alone or in combination with one or more of the first through sixteenth aspects, the downlink communication scheduled by the second DCI is a PDSCH communication.

In an eighteenth aspect, alone or in combination with one or more of the first through seventeenth aspects, the TCI state indicated in the first DCI is a TCI state to be applied for communications associated with the first CORESET pool index starting from the starting time associated with the first DCI.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
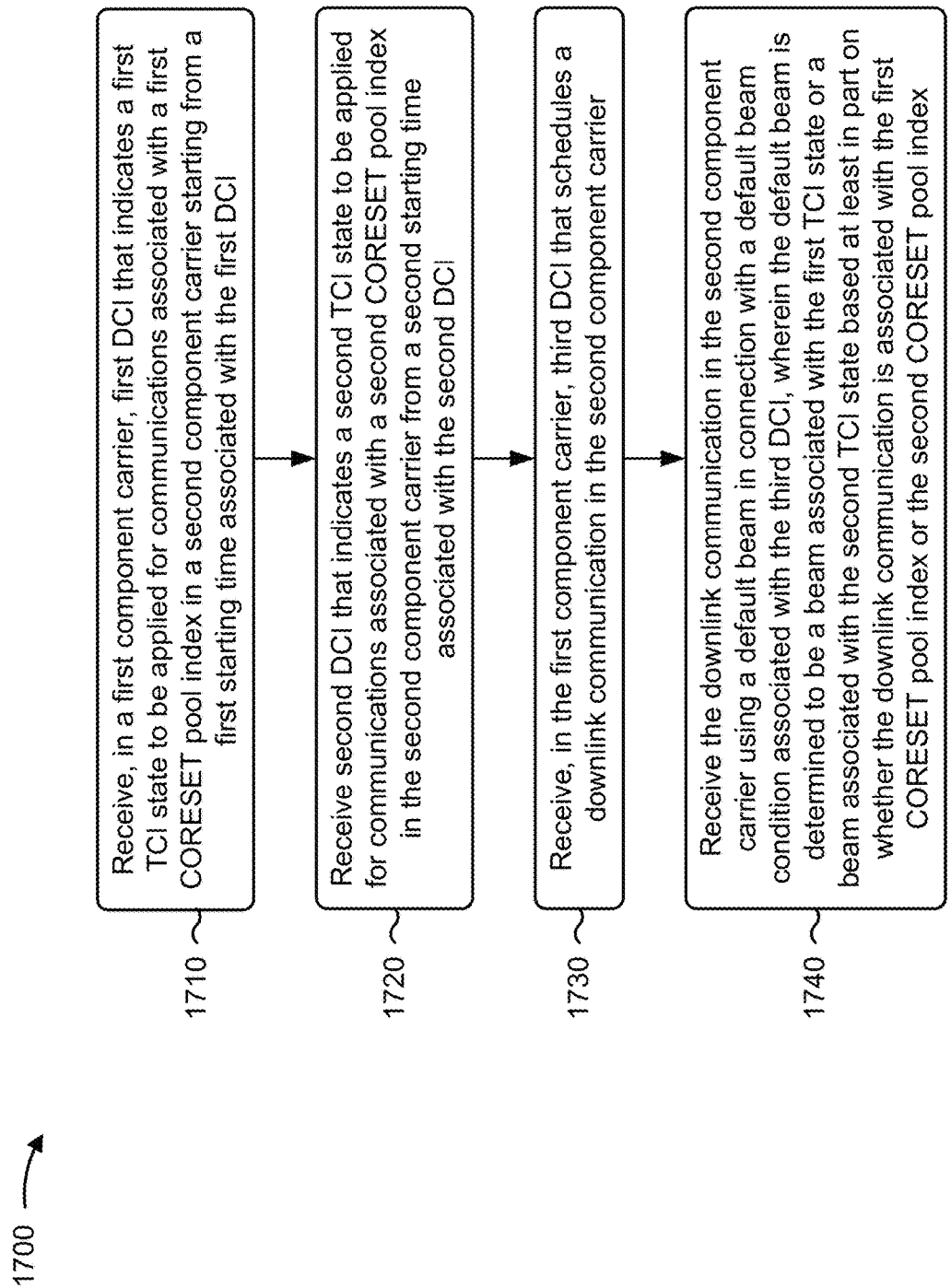
FIG. 17 is a diagram illustrating an example process associated with a default beam for multi-DCI based multi-TRP with cross-carrier scheduling and a unified TCI, in accordance with the present disclosure.

FIG. 17 is a diagram illustrating an example process 1700 performed, for example, by a UE, in accordance with the present disclosure. Example process 1700 is an example where the UE (e.g., UE 120) performs operations associated with a default beam for multi-DCI based multi-TRP with cross-carrier scheduling and a unified TCI.

As shown in FIG. 17, in some aspects, process 1700 may include receiving, in a first component carrier, first DCI that indicates a first TCI state to be applied for communications associated with a first CORESET pool index in a second component carrier starting from a first starting time associated with the first DCI (block 1710). For example, the UE (e.g., using communication manager 140 and/or reception component 1802, depicted in FIG. 18) may receive, in a first component carrier, first DCI that indicates a first TCI state to be applied for communications associated with a first CORESET pool index in a second component carrier starting from a first starting time associated with the first DCI, as described above.

As further shown in FIG. 17, in some aspects, process 1700 may include receiving second DCI that indicates a second TCI state to be applied for communications associated with a second CORESET pool index in the second component carrier starting from a second starting time associated with the second DCI (block 1720). For example, the UE (e.g., using communication manager 140 and/or reception component 1802, depicted in FIG. 18) may receive second DCI that indicates a second TCI state to be applied for communications associated with a second CORESET pool index in the second component carrier starting from a second starting time associated with the second DCI, as described above.

As further shown in FIG. 17, in some aspects, process 1700 may include receiving, in the first component carrier, third DCI that schedules a downlink communication in the second component carrier (block 1730). For example, the UE (e.g., using communication manager 140 and/or reception component 1802, depicted in FIG. 18) may receive, in the first component carrier, third DCI that schedules a downlink communication in the second component carrier, as described above.

As further shown in FIG. 17, in some aspects, process 1700 may include receiving the downlink communication in the second component carrier using a default beam in connection with a default beam condition associated with the third DCI, wherein the default beam is determined to be a beam associated with the first TCI state or a beam associated with the second TCI state based at least in part on whether the downlink communication is associated with the first CORESET pool index or the second CORESET pool index (block 1740). For example, the UE (e.g., using communication manager 140 and/or reception component 1802, depicted in FIG. 18) may receive the downlink communication in the second component carrier using a default beam in connection with a default beam condition associated with the third DCI, wherein the default beam is determined to be a beam associated with the first TCI state or a beam associated with the second TCI state based at least in part on whether the downlink communication is associated with the first CORESET pool index or the second CORESET pool index, as described above.

Process 1700 may include additional aspects, such as any single aspect or any combination of aspects described below and/or in connection with one or more other processes described elsewhere herein.

In a first aspect, the UE is configured with respective default beams enabled for the first CORESET pool index and the second CORESET pool index.

In a second aspect, receiving the downlink communication in the second component carrier using the default beam in connection with the default beam condition associated with the third DCI includes receiving the downlink communication in the second component carrier using a default beam in connection with a scheduling offset between the second DCI and the downlink communication being less than a time duration for QCL.

In a third aspect, the downlink communication is associated with the first CORESET pool index and the default beam is the beam associated with the first TCI state.

In a fourth aspect, the first TCI state is a latest indicated TCI state associated with the first CORESET pool index to be applied in the second component carrier.

In a fifth aspect, the downlink communication is associated with the second CORESET pool index and the default beam is the beam associated with the second TCI state.

In a sixth aspect, the second TCI state is a latest indicated TCI state associated with the second CORESET pool index to be applied in the second component carrier.

In a seventh aspect, the downlink communication scheduled by the third DCI is a PDSCH communication in the second component carrier.

In an eighth aspect, the first CORESET pool index is associated with a first transmit receive point and the second CORESET pool index is associated with a second transmit receive point.

In a ninth aspect, receiving the second DCI includes receiving the second DCI in the first component carrier.

In a tenth aspect, receiving the second DCI includes receiving the second DCI in a third component carrier that is different from the first component carrier and the second component carrier.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
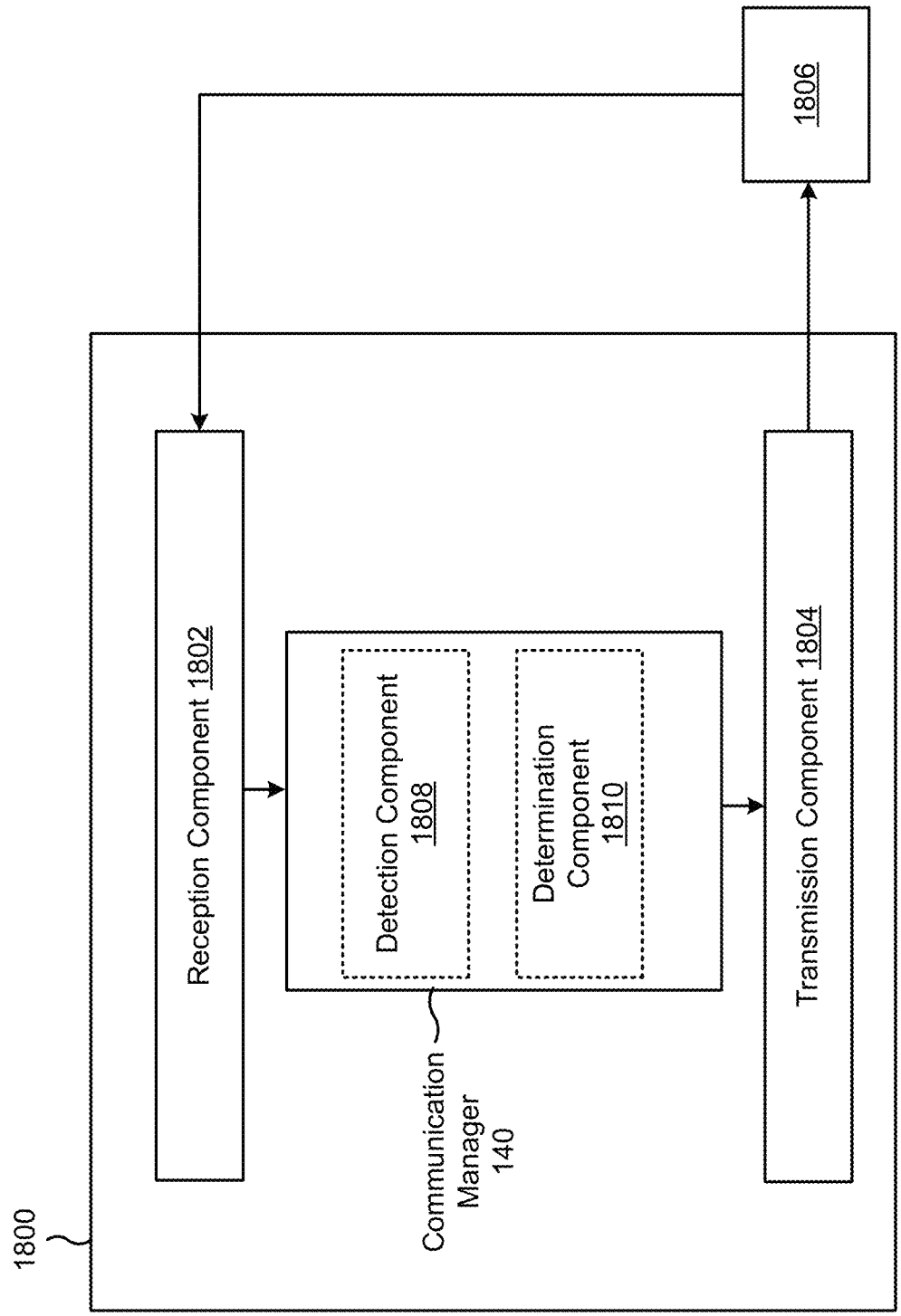
FIGS. 18-19 are diagrams of example apparatuses for wireless communication, in accordance with the present disclosure.

FIG. 18 is a diagram of an example apparatus 1800 for wireless communication. The apparatus 1800 may be a UE, or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 140. The communication manager 140 may include one or more of a detection component 1808 and/or a determination component 1810, among other examples.

In some aspects, the apparatus 1800 may be configured to perform one or more operations described herein in connection with FIGS. 11-14. Additionally, or alternatively, the apparatus 1800 may be configured to perform one or more processes described herein, such as process 1500 of FIG. 15, process 1700 of FIG. 17, or a combination thereof. In some aspects, the apparatus 1800 and/or one or more components shown in FIG. 18 may include one or more components of the UE described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the UE described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the UE described in connection with FIG. 2. In some aspects, the transmission component 1804 may be co-located with the reception component 1802 in a transceiver.

The reception component 1802 may receive, in a first CORESET associated with a first CORESET pool index, first DCI that indicates a first TCI state to be applied starting from a first starting time associated with the first DCI. The reception component 1802 may receive, in a second CORESET associated with a second CORESET pool index, second DCI that indicates a second TCI state to be applied starting from a second starting time associated with the second DCI. The reception component 1802 may receive third DCI that schedules a downlink communication. The reception component 1802 may receive the downlink communication using a default beam associated with the first CORESET pool index or the second CORESET pool index in connection with a default beam condition associated with the third DCI.

The detection component 1808 may detect the default beam condition associated with the third DCI.

The determination component 1810 may determine the default beam for the downlink communication.

The reception component 1802 may receive an RRC message including a configuration of the pattern, wherein the configuration of the pattern indicates at least one of a first set of slots in which the default beam is associated with the first CORESET pool index or a second set of slots in which the default beam is associated with the second CORESET pool index.

The reception component 1802 may receive an indication of the pattern in a MAC-CE that indicates one or more active TCI states for at least one of the first CORESET pool index or the second CORESET pool index, wherein the indication of the pattern indicates at least one of a first set of slots in which the default beam is associated with the first CORESET pool index or a second set of slots in which the default beam is associated with the second CORESET pool index.

The reception component 1802 may receive a MAC-CE that indicates one or more TCI codepoints for the first CORESET pool index and a mapping between each TCI codepoint of the one or more TCI codepoints for the first CORESET pool index and a respective TCI state and pattern combination.

The reception component 1802 may receive, in a first component carrier, first DCI that indicates a first TCI state to be applied for communications associated with a first CORESET pool index in a second component carrier starting from a first starting time associated with the first DCI. The reception component 1802 may receive second DCI that indicates a second TCI state to be applied for communications associated with a second CORESET pool index in the second component carrier starting from a second starting time associated with the second DCI. The reception component 1802 may receive, in the first component carrier, third DCI that schedules a downlink communication in the second component carrier. The reception component 1802 may receive the downlink communication in the second component carrier using a default beam in connection with a default beam condition associated with the third DCI, wherein the default beam is determined to be a beam associated with the first TCI state or a beam associated with the second TCI state based at least in part on whether the downlink communication is associated with the first CORESET pool index or the second CORESET pool index.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
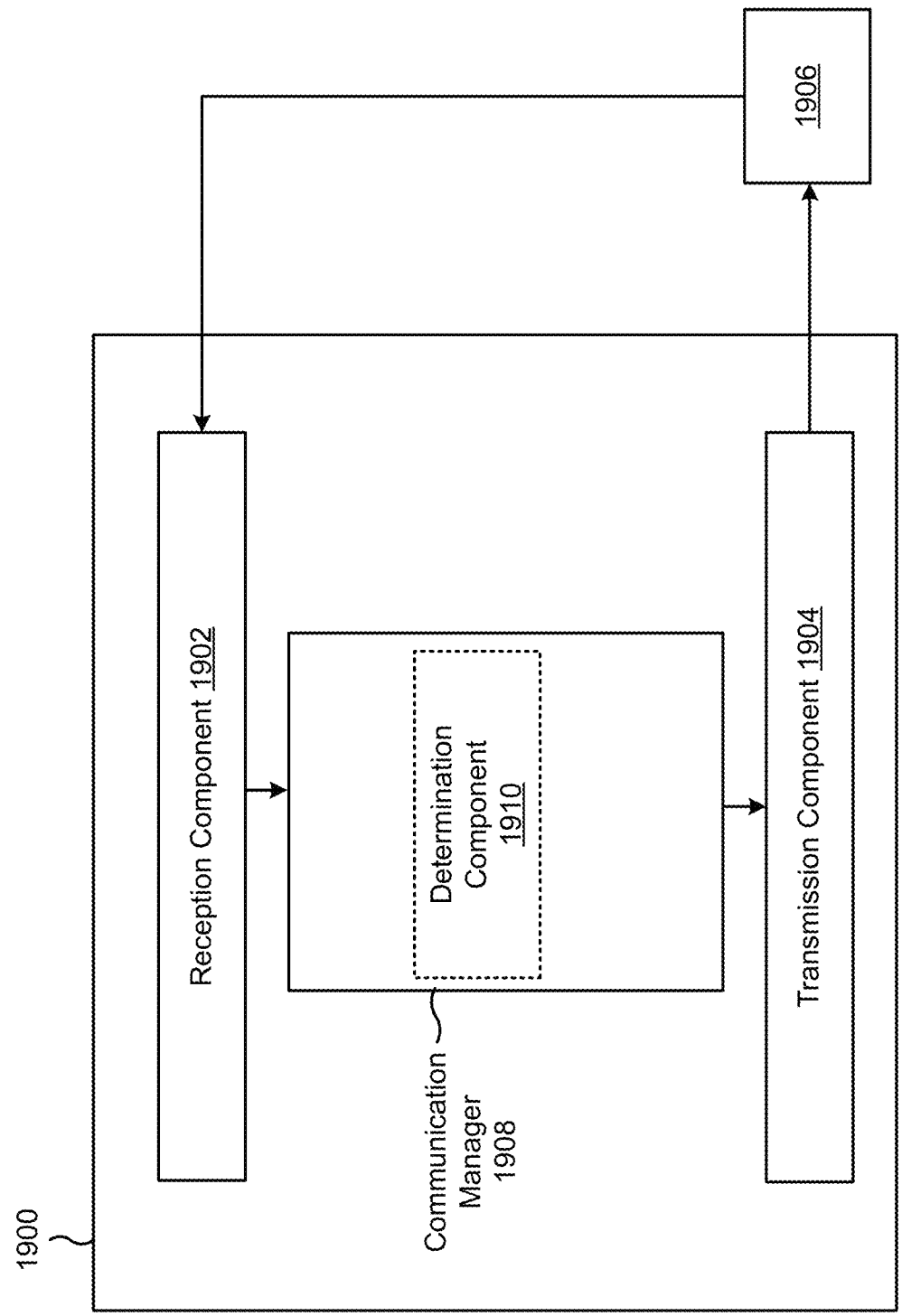

FIG. 19 is a diagram of an example apparatus 1900 for wireless communication. The apparatus 1900 may be a network node, or a network node may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include the communication manager 1908. The communication manager 1908 may include a determination component 1910, among other examples.

In some aspects, the apparatus 1900 may be configured to perform one or more operations described herein in connection with FIGS. 11-14. Additionally, or alternatively, the apparatus 1900 may be configured to perform one or more processes described herein, such as process 1600 of FIG. 16, or a combination thereof. In some aspects, the apparatus 1900 and/or one or more components shown in FIG. 19 may include one or more components of the network node described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The communication manager 1908 may control and/or otherwise manage one or more operations of the reception component 1902 and/or the transmission component 1904. In some aspects, the communication manager 1908 may include one or more antennas, a modem, a controller/processor, a memory, or a combination thereof, of the base station described in connection with FIG. 2. The communication manager 1908 may be, or be similar to, the communication manager 150 depicted in FIGS. 1 and 2. For example, in some aspects, the communication manager 1908 may be configured to perform one or more of the functions described as being performed by the communication manager 150. In some aspects, the communication manager 1908 may include the reception component 1902 and/or the transmission component 1904.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a modem, a demodulator, a MIMO detector, a receive processor, a controller/processor, a memory, or a combination thereof, of the network node described in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modem, a modulator, a transmit MIMO processor, a transmit processor, a controller/processor, a memory, or a combination thereof, of the network node described in connection with FIG. 2. In some aspects, the transmission component 1904 may be co-located with the reception component 1902 in a transceiver.

The transmission component 1904 may transmit, in a first CORESET associated with a first CORESET pool index of multiple CORESET pool indexes configured for a UE, first DCI that indicates a TCI state to be applied starting from a starting time associated with the first DCI. The transmission component 1904 may transmit a downlink communication scheduled by second DCI using a default beam in connection with a default beam condition associated with the second DCI and in connection with the default beam being associated with the first CORESET pool index.

The transmission component 1904 may transmit the second DCI that schedules the downlink communication.

The transmission component 1904 may transmit, to the UE, an RRC message including a configuration of the pattern, wherein the configuration of the pattern indicates at least one of a first set of slots in which the default beam is associated with the first CORESET pool index or a second set of slots in which the default beam is associated with the second CORESET pool index.

The transmission component 1904 may transmit, to the UE, an indication of the pattern in a MAC-CE that indicates one or more activated TCI states for at least one of the first CORESET pool index or the second CORESET pool index, wherein the indication of the pattern indicates at least one of a first set of slots in which the default beam is associated with the first CORESET pool index or a second set of slots in which the default beam is associated with the second CORESET pool index.

The transmission component 1904 may transmit, to the UE, a MAC-CE that indicates one or more TCI codepoints for the first CORESET pool index and a mapping between each TCI codepoint of the one or more TCI codepoints for the first CORESET pool index and a respective TCI state and pattern combination.

The determination component 1910 may determine the TCI state to be indicated by the first DCI, and/or a pattern that indicates at least one of a first set of slots in which the default beam is associated with the first CORESET pool index or a second set of slots in which the default beam is associated with the second CORESET pool index.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The following provides an overview of some Aspects of the present disclosure:

Aspect 1: A method of wireless communication performed by a user equipment (UE), comprising: receiving, in a first control resource set (CORESET) associated with a first CORESET pool index, first downlink control information (DCI) that indicates a first transmission configuration indicator (TCI) state to be applied starting from a first starting time associated with the first DCI; receiving, in a second CORESET associated with a second CORESET pool index, second DCI that indicates a second TCI state to be applied starting from a second starting time associated with the second DCI; receiving third DCI that schedules a downlink communication; and receiving the downlink communication using a default beam associated with the first CORESET pool index or the second CORESET pool index in connection with a default beam condition associated with the third DCI.

Aspect 2: The method of Aspect 1, wherein the UE is not configured with respective default beams enabled for the first CORESET pool index and the second CORESET pool index.

Aspect 3: The method of any of Aspects 1-2, wherein receiving the downlink communication using the default beam associated with the first CORESET pool index or the second CORESET pool index in connection with the default beam condition associated with the third DCI comprises: receiving the downlink communication using the default beam associated with the first CORESET pool index or the second CORESET pool index in connection with a scheduling offset between the second DCI and the downlink communication being less than a time duration for quasi co-location (QCL).

Aspect 4: The method of any of Aspects 1-3, wherein the default beam is a beam corresponding to a latest indicated TCI state associated with a fixed CORESET pool index, and wherein the fixed CORESET pool index is the first CORESET pool index or the second CORESET pool index.

Aspect 5: The method of Aspect 4, wherein the fixed CORESET pool index is the first CORESET pool index and the latest indicated TCI state associated with the fixed CORESET pool index is the first TCI state.

Aspect 6: The method of any of Aspects 1-3, wherein the default beam is a beam associated with a CORESET with a lowest CORESET identifier among one or more CORESETs associated with a fixed CORESET pool index monitored in a latest slot in which at least one CORESET associated with the fixed CORESET pool index is monitored, and wherein the fixed CORESET pool index is the first CORESET pool index or the second CORESET pool index.

Aspect 7: The method of any of Aspects 1-3, wherein the default beam is determined to be associated with the first CORESET pool index or the second CORESET pool index based at least in part on a slot in which the downlink communication is scheduled and a pattern in a time domain.

Aspect 8: The method of Aspect 7, wherein the default beam is a beam associated with the first TCI state based at least in part on a determination that the default beam is associated with the first CORESET pool index, or wherein the default beam is a beam associated with the second TCI state based at least in part on a determination that the default beam is associated with the second CORESET pool index.

Aspect 9: The method of any of Aspects 7-8, wherein the pattern is a slot-level pattern that identifies a first set of slots in which the default beam is associated with the first CORESET pool index and a second set of slots in which the default beam is associated with the second CORESET pool index.

Aspect 10: The method of Aspect 9, wherein the slot-level pattern is based at least in part on a slot number.

Aspect 11: The method of Aspect 10, wherein the first set of slots includes slots with even slot numbers and the second set of slots includes slots with odd slot numbers.

Aspect 12: The method of any of Aspects 10-11, wherein the slot-level pattern is based at least in part on an absolute slot number, or the slot-level pattern is based at least in part on a relative slot number relative to a slot in which the first TCI state or the second TCI state is applied.

Aspect 13: The method of any of Aspects 7-12, further comprising: receiving a radio resource control (RRC) message including a configuration of the pattern, wherein the configuration of the pattern indicates at least one of a first set of slots in which the default beam is associated with the first CORESET pool index or a second set of slots in which the default beam is associated with the second CORESET pool index.

Aspect 14: The method of any of Aspects 7-12, further comprising: receiving an indication of the pattern in a medium access control (MAC) control element (MAC-CE) that indicates one or more active TCI states for at least one of the first CORESET pool index or the second CORESET pool index, wherein the indication of the pattern indicates at least one of a first set of slots in which the default beam is associated with the first CORESET pool index or a second set of slots in which the default beam is associated with the second CORESET pool index.

Aspect 15: The method of any of Aspects 7-12, wherein the first DCI includes an indication of a TCI codepoint that indicates the first TCI state and a pattern for a first set of slots in which the default beam is associated with the first CORESET pool index.

Aspect 16: The method of Aspect 15, further comprising: receiving a medium access control (MAC) control element (MAC-CE) that indicates one or more TCI codepoints for the first CORESET pool index and a mapping between each TCI codepoint of the one or more TCI codepoints for the first CORESET pool index and a respective TCI state and pattern combination.

Aspect 17: The method of any of Aspects 15-16, wherein the second DCI includes an indication of a TCI codepoint that indicates the second TCI state and a pattern for a second set of slots in which the default beam is associated with the second CORESET pool index.

Aspect 18: The method of any of Aspects 1-17, wherein the first CORESET pool index is associated with a first transmit receive point and the second CORESET pool index is associated with a second transmit receive point.

Aspect 19: The method of any of Aspects 1-18, wherein the downlink communication scheduled by the third DCI is a physical downlink shared channel (PDSCH) communication.

Aspect 20: The method of any of Aspects 1-19, wherein the first TCI state is a TCI state to be applied for communications associated with the first CORESET pool index starting from the first starting time associated with the first DCI, and the second TCI state is a TCI state to be applied for communications associated with the second CORESET pool index starting from the second starting time associated with the second DCI.

Aspect 21: A method of wireless communication performed by a network node, comprising: transmitting, in a first control resource set (CORESET) associated with a first CORESET pool index of multiple CORESET pool indexes configured for a user equipment (UE), first downlink control information (DCI) that indicates a transmission configuration indicator (TCI) state to be applied starting from a starting time associated with the first DCI; and transmitting a downlink communication scheduled by second DCI using a default beam in connection with a default beam condition associated with the second DCI and in connection with the default beam being associated with the first CORESET pool index.

Aspect 22: The method of Aspect 21, further comprising: transmitting the second DCI that schedules the downlink communication.

Aspect 23: The method of any of Aspects 21-22, wherein the UE is not configured with respective default beams enabled for the multiple CORESET indexes configured for the UE.

Aspect 24: The method of any of Aspects 21-23, wherein transmitting the downlink communication scheduled by second DCI using the default beam in connection with the default beam condition and in connection with the default beam being associated with the first CORESET pool index comprises: transmitting the downlink communication using the default beam in connection with a scheduling offset between the second DCI and the downlink communication being less than a time duration for quasi co-location (QCL) and in connection with the default beam being associated with the first CORESET pool index.

Aspect 25: The method of any of Aspects 21-24, wherein the default beam is a beam corresponding to a latest indicated TCI state associated with a fixed CORESET pool index of the multiple CORESET pool indexes configured for the UE, wherein the fixed CORESET pool index is the first CORESET pool index, and wherein the latest indicated TCI state associated with the fixed CORESET pool index is the TCI state indicated in the first DCI.

Aspect 26: The method of any of Aspects 21-24, wherein the default beam is a beam associated with a CORESET with a lowest CORESET identifier among one or more CORESETs associated with a fixed CORESET pool index monitored in a latest slot in which at least one CORESET associated with the fixed CORESET pool index is monitored, wherein the fixed CORESET pool index is the first CORESET pool index.

Aspect 27: The method of any of Aspects 21-24, wherein the default beam is determined to be associated with the first CORESET pool index or a second CORESET pool index, of the multiple CORESET pool indexes configured for the UE, based at least in part on a slot in which the downlink communication is scheduled and a pattern in a time domain.

Aspect 28: The method of Aspect 27, wherein the default beam is a beam associated with the TCI state indicated in the first DCI based at least in part on a determination that the default beam is associated with the first CORESET pool index.

Aspect 29: The method of any of Aspects 27-28, wherein the pattern is a slot-level pattern that identifies a first set of slots in which the default beam is associated with the first CORESET pool index and a second set of slots in which the default beam is associated with the second CORESET pool index.

Aspect 30: The method of Aspect 29, wherein the slot-level pattern is based at least in part on a slot number.

Aspect 31: The method of Aspect 30, wherein the first set of slots includes slots with even slot numbers and the second set of slots includes slots with odd slot numbers.

Aspect 32: The method of any of Aspects 30-31, wherein the slot-level pattern is based at least in part on an absolute slot number, or the slot-level pattern is based at least in part on a relative slot number relative to a slot in which the TCI state indicated in the first DCI is applied.

Aspect 33: The method of any of Aspects 27-32, further comprising: transmitting, to the UE, a radio resource control (RRC) message including a configuration of the pattern, wherein the configuration of the pattern indicates at least one of a first set of slots in which the default beam is associated with the first CORESET pool index or a second set of slots in which the default beam is associated with the second CORESET pool index.

Aspect 34: The method of any of Aspects 27-32, further comprising: transmitting, to the UE, an indication of the pattern in a medium access control (MAC) control element (MAC-CE) that indicates one or more activated TCI states for at least one of the first CORESET pool index or the second CORESET pool index, wherein the indication of the pattern indicates at least one of a first set of slots in which the default beam is associated with the first CORESET pool index or a second set of slots in which the default beam is associated with the second CORESET pool index.

Aspect 35: The method of any of Aspects 27-32, wherein the first DCI includes an indication of a TCI codepoint that indicates the TCI state and a pattern for a first set of slots in which the default beam is associated with the first CORESET pool index.

Aspect 36: The method of Aspect 35, further comprising: transmitting, to the UE, a medium access control (MAC) control element (MAC-CE) that indicates one or more TCI codepoints for the first CORESET pool index and a mapping between each TCI codepoint of the one or more TCI codepoints for the first CORESET pool index and a respective TCI state and pattern combination.

Aspect 37: The method of any of Aspects 21-36, wherein the first CORESET pool index is associated with a first transmit receive point and a second CORESET pool index, of the multiple CORESET pool indexes configured for the UE, is associated with a second transmit receive point.

Aspect 38: The method of any of Aspects 21-37, wherein the downlink communication scheduled by the second DCI is a physical downlink shared channel (PDSCH) communication.

Aspect 39: The method of any of Aspects 21-38, wherein the TCI state indicated in the first DCI is a TCI state to be applied for communications associated with the first CORESET pool index starting from the starting time associated with the first DCI.

Aspect 40: A method of wireless communication performed by a user equipment (UE), comprising: receiving, in a first component carrier, first downlink control information (DCI) that indicates a first transmission configuration indicator (TCI) state to be applied for communications associated with a first control resource set (CORESET) pool index in a second component carrier starting from a first starting time associated with the first DCI; receiving second DCI that indicates a second TCI state to be applied for communications associated with a second CORESET pool index in the second component carrier starting from a second starting time associated with the second DCI; receiving, in the first component carrier, third DCI that schedules a downlink communication in the second component carrier; and receiving the downlink communication in the second component carrier using a default beam in connection with a default beam condition associated with the third DCI, wherein the default beam is determined to be a beam associated with the first TCI state or a beam associated with the second TCI state based at least in part on whether the downlink communication is associated with the first CORESET pool index or the second CORESET pool index.

Aspect 41: The method of Aspect 40, wherein the UE is configured with respective default beams enabled for the first CORESET pool index and the second CORESET pool index.

Aspect 42: The method of any of Aspects 40-41, wherein receiving the downlink communication in the second component carrier using the default beam in connection with the default beam condition associated with the third DCI comprises: receiving the downlink communication in the second component carrier using a default beam in connection with a scheduling offset between the second DCI and the downlink communication being less than a time duration for quasi co-location (QCL).

Aspect 43: The method of any of Aspects 40-42, wherein the downlink communication is associated with the first CORESET pool index and the default beam is the beam associated with the first TCI state.

Aspect 44: The method of Aspect 43, wherein the first TCI state is a latest indicated TCI state associated with the first CORESET pool index to be applied in the second component carrier.

Aspect 45: The method of any of Aspects 40-42, wherein the downlink communication is associated with the second CORESET pool index and the default beam is the beam associated with the second TCI state.

Aspect 46: The method of Aspect 45, wherein the second TCI state is a latest indicated TCI state associated with the second CORESET pool index to be applied in the second component carrier.

Aspect 47: The method of any of Aspects 40-46, wherein the downlink communication scheduled by the third DCI is a physical downlink shared channel (PDSCH) communication in the second component carrier.

Aspect 48: The method of any of Aspects 40-47, wherein the first CORESET pool index is associated with a first transmit receive point and the second CORESET pool index is associated with a second transmit receive point.

Aspect 49: The method of any of Aspects 40-48, wherein receiving the second DCI comprises: receiving the second DCI in the first component carrier.

Aspect 50: The method of any of Aspects 40-48, wherein receiving the second DCI comprises: receiving the second DCI in a third component carrier that is different from the first component carrier and the second component carrier.

Aspect 51: An apparatus for wireless communication at a device, comprising a processor; memory coupled with the processor; and instructions stored in the memory and executable by the processor to cause the apparatus to perform the method of one or more of Aspects 1-20.

Aspect 52: A device for wireless communication, comprising a memory and one or more processors coupled to the memory, the one or more processors configured to perform the method of one or more of Aspects 1-20.

Aspect 53: An apparatus for wireless communication, comprising at least one means for performing the method of one or more of Aspects 1-20.

Aspect 54: A non-transitory computer-readable medium storing code for wireless communication, the code comprising instructions executable by a processor to perform the method of one or more of Aspects 1-20.

Aspect 55: A non-transitory computer-readable medium storing a set of instructions for wireless communication, the set of instructions comprising one or more instructions that, when executed by one or more processors of a device, cause the device to perform the method of one or more of Aspects 1-20.

Aspect 56: An apparatus for wireless communication at a device, comprising a processor; memory coupled with the processor; and instructions stored in the memory and executable by the processor to cause the apparatus to perform the method of one or more of Aspects 21-39.

Aspect 57: A device for wireless communication, comprising a memory and one or more processors coupled to the memory, the one or more processors configured to perform the method of one or more of Aspects 21-39.

Aspect 58: An apparatus for wireless communication, comprising at least one means for performing the method of one or more of Aspects 21-39.

Aspect 59: A non-transitory computer-readable medium storing code for wireless communication, the code comprising instructions executable by a processor to perform the method of one or more of Aspects 21-39.

Aspect 60: A non-transitory computer-readable medium storing a set of instructions for wireless communication, the set of instructions comprising one or more instructions that, when executed by one or more processors of a device, cause the device to perform the method of one or more of Aspects 21-39.

Aspect 61: An apparatus for wireless communication at a device, comprising a processor; memory coupled with the processor; and instructions stored in the memory and executable by the processor to cause the apparatus to perform the method of one or more of Aspects 40-50.

Aspect 62: A device for wireless communication, comprising a memory and one or more processors coupled to the memory, the one or more processors configured to perform the method of one or more of Aspects 40-50.

Aspect 63: An apparatus for wireless communication, comprising at least one means for performing the method of one or more of Aspects 40-50.

Aspect 64: A non-transitory computer-readable medium storing code for wireless communication, the code comprising instructions executable by a processor to perform the method of one or more of Aspects 40-50.

Aspect 65: A non-transitory computer-readable medium storing a set of instructions for wireless communication, the set of instructions comprising one or more instructions that, when executed by one or more processors of a device, cause the device to perform the method of one or more of Aspects 40-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, in a first control resource set (CORESET) associated with a first CORESET pool index, first downlink control information (DCI) that indicates a first transmission configuration indicator (TCI) state applicable from a first starting time associated with the first DCI;
      receive, in a second CORESET associated with a second CORESET pool index, second DCI that indicates a second TCI state applicable from a second starting time associated with the second DCI;
      receive third DCI that schedules a downlink communication; and
      receive the downlink communication according to the first TCI state or the second TCI state based at least in part on a time duration between the reception of the third DCI and the downlink communication.

2. The UE of claim 1, wherein the one or more processors, to receive the downlink communication, are further configured to:
   receive the downlink communication according to the first TCI state based at least in part on the time duration satisfying a threshold.

3. The UE of claim 2, wherein the time duration satisfying a threshold comprises the time duration being smaller than the threshold.

4. The UE of claim 1, wherein the one or more processors, to receive the downlink communication, are further configured too:
   receive the downlink communication with a first beam associated with the first TCI state.

5. The UE of claim 4, wherein the first TCI state indicates one or more quasi-co-location (QCL) properties of the first beam.

6. The UE of claim 5, wherein the one or more QCL properties comprise a Doppler shift, a Doppler spread, an average delay, a delay spread, or spatial receive parameters a Doppler shift, a Doppler spread, an average delay, a delay spread, or one or more spatial receive parameters.

7. The UE of claim 1, wherein the one or more processors, to receive the third DCI, are further configured to:
   receive the third DCI in the first CORESET.

8. The UE of claim 1, wherein the one or more processors, to receive the third DCI, are further configured to:
   receive the third DCI in a third CORESET, wherein the third CORESET is associated with the first CORESET pool index.

9. The UE of claim 1, wherein the downlink communication comprises a physical downlink shared channel communication (PDSCH).

10. The UE of claim 1, wherein the time duration comprises a scheduling offset.

11. The UE of claim 1, wherein the time duration fails to satisfy a threshold, wherein the one or more processors, to receive the downlink communication, are further configured to:
    receive the downlink communication according to the first TCI state based at least in part on the first CORESET pool index corresponding to a lowest CORESET pool index value among the first CORESET pool index and the second CORESET pool index.

12. The UE of claim 1, wherein the time duration fails to satisfy a threshold, wherein the one or more processors, to receive the downlink communication, are further configured to:
    receive the downlink communication according to the second TCI state based at least in part on the second CORESET pool index corresponding to a lowest CORESET pool index value among the first CORESET pool index and the second CORESET pool index.

13. The UE of claim 1, wherein the first CORESET pool index corresponds to a lowest CORESET pool index value among the first CORESET pool index and the second CORESET pool index.

14. A method for wireless communication at a user equipment (UE), comprising:
    receiving, in a first control resource set (CORESET) associated with a first CORESET pool index, first downlink control information (DCI) that indicates a first transmission configuration indicator (TCI) state applicable from a first starting time associated with the first DCI;
    receiving, in a second CORESET associated with a second CORESET pool index, second DCI that indicates a second TCI state applicable from a second starting time associated with the second DCI;
    receiving third DCI that schedules a downlink communication; and
    receiving the downlink communication according to the first TCI state or the second TCI state based at least in part on a time duration between the reception of the third DCI and the downlink communication.

15. The method of claim 14, wherein receiving the downlink communication further comprises:
    receiving the downlink communication according to the first TCI state based at least in part on the time duration satisfying a threshold.

16. The method of claim 14, wherein the receiving the downlink communication further comprises:
    receiving the downlink communication with a first beam associated with the first TCI state.

17. The method of claim 14, wherein the time duration fails to satisfy a threshold, wherein receiving the downlink communication comprises:
receiving the downlink communication according to the first TCI state based at least in part on the first CORESET pool index corresponding to a lowest CORESET pool index value among the first CORESET pool index and the second CORESET pool index.

18. The method of claim 14, wherein the time duration fails to satisfy a threshold, wherein receiving the downlink communication comprises:
receiving the downlink communication according to the second TCI state based at least in part on the second CORESET pool index corresponding to a lowest CORESET pool index value among the first CORESET pool index and the second CORESET pool index.

19. The method of claim 14, wherein receiving the third DCI comprises:
receiving the third DCI in the first CORESET.

20. A non-transitory computer-readable medium storing a set of instructions for wireless communication, the set of instructions comprising:
one or more instructions that, when executed by one or more processors of a user equipment (UE), cause the UE to:
receive, in a first control resource set (CORESET) associated with a first CORESET pool index, first downlink control information (DCI) that indicates a first transmission configuration indicator (TCI) state applicable from a first starting time associated with the first DCI;
receive, in a second CORESET associated with a second CORESET pool index, second DCI that indicates a second TCI state applicable from a second starting time associated with the second DCI;
receive third DCI that schedules a downlink communication; and
receive the downlink communication according to the first TCI state or the second TCI state based at least in part on a time duration between the reception of the third DCI and the downlink communication.

\* \* \* \* \*